US008997021B2

(12) United States Patent
Liang et al.

(10) Patent No.: US 8,997,021 B2
(45) Date of Patent: Mar. 31, 2015

(54) PARALLAX AND/OR THREE-DIMENSIONAL EFFECTS FOR THUMBNAIL IMAGE DISPLAYS

(71) Applicant: Lytro, Inc., Mountain View, CA (US)

(72) Inventors: Chia-Kai Liang, Mountain View, CA (US); Michael Knott, San Mateo, CA (US); Mugur Marculescu, Los Altos, CA (US); Jason Wilson, Mill Valley, CA (US); Yi-Ren Ng, Palo Alto, CA (US)

(73) Assignee: Lytro, Inc., Mountain View, CA (US)

( * ) Notice: Subject to any disclaimer, the term of this patent is extended or adjusted under 35 U.S.C. 154(b) by 203 days.

(21) Appl. No.: 13/669,800

(22) Filed: Nov. 6, 2012

(65) Prior Publication Data
US 2014/0129988 A1  May 8, 2014

(51) Int. Cl.
*G06F 3/048* (2013.01)
(52) U.S. Cl.
USPC ............ 715/838; 345/473; 345/636; 345/654
(58) Field of Classification Search
CPC ... H04N 5/262; H04N 5/272; H04N 5/23277; H04N 1/00442; G03B 15/00; G03B 37/04; G06F 17/30247; G06F 3/04845; G06F 3/04817; G06F 3/0481; G06F 3/0482; G06F 17/30274; G09G 5/14
USPC .................. 715/838, 788; 382/154, 232, 285; 345/422, 419, 638, 640; 348/239, 348/333.05, 43, 46, 51, 47
See application file for complete search history.

(56) References Cited

U.S. PATENT DOCUMENTS

| 725,567 A | 4/1903 | Ives |
| 4,383,170 A | 5/1983 | Takagi et al. |
| 4,661,986 A | 4/1987 | Adelson |
| 4,694,185 A | 9/1987 | Weiss |
| 4,920,419 A | 4/1990 | Easterly |

(Continued)

FOREIGN PATENT DOCUMENTS

| DE | 19624421 | 6/1996 | |
| EP | 2509323 A2 * | 10/2012 | ............. H04N 13/00 |

(Continued)

OTHER PUBLICATIONS

Adelson et al., "Single Lens Stereo with a Plenoptic Camera" IEEE Translation on Pattern Analysis and Machine Intelligence, Feb. 1992. vol. 14, No. 2, pp. 99-106.

(Continued)

*Primary Examiner* — Boris Pesin
*Assistant Examiner* — Mandrita Brahmachari
(74) *Attorney, Agent, or Firm* — Raubvogel Law Office

(57) ABSTRACT

According to various embodiments of the invention, parallax and/or three-dimensional effects are added to thumbnail image displays. In at least one embodiment, such effects are applied in a manner that causes the thumbnail images to appear to respond to their display environment. For example, a parallax effect can be applied that responds to current cursor position, scroll position, scroll velocity, orientation of the display device (detected, for example, by position- and/or motion-sensing mechanisms), and/or any other environmental conditions. As another example, thumbnail images can be refocused, and/or a viewpoint for an image can be adjusted, in response to a user clicking on or tapping on particular elements within such images.

42 Claims, 21 Drawing Sheets

(56) References Cited

U.S. PATENT DOCUMENTS

| | | | |
|---|---|---|---|
| 5,076,687 A | 12/1991 | Adelson | |
| 5,282,045 A | 1/1994 | Mimura et al. | |
| 5,610,390 A | 3/1997 | Miyano | |
| 5,748,371 A | 5/1998 | Cathey, Jr. et al. | |
| 5,757,423 A | 5/1998 | Tanaka et al. | |
| 5,949,433 A | 9/1999 | Klotz | |
| 6,023,523 A | 2/2000 | Cohen et al. | |
| 6,028,606 A | 2/2000 | Kolb et al. | |
| 6,097,394 A | 8/2000 | Levoy et al. | |
| 6,201,899 B1 | 3/2001 | Bergen | |
| 6,320,979 B1 | 11/2001 | Melen | |
| 6,483,535 B1 | 11/2002 | Tamburrino et al. | |
| 6,577,342 B1 | 6/2003 | Wester | |
| 6,597,859 B1 | 7/2003 | Leinhart et al. | |
| 6,842,297 B2 | 1/2005 | Dowski, Jr. et al. | |
| 6,900,841 B1 | 5/2005 | Mihara | |
| 6,927,922 B2 | 8/2005 | George et al. | |
| 7,034,866 B1 | 4/2006 | Colmenarez et al. | |
| 7,336,430 B2 | 2/2008 | George | |
| 7,620,309 B2 | 11/2009 | Georgiev | |
| 7,623,726 B1 | 11/2009 | Georgiev | |
| 7,949,252 B1 | 5/2011 | Georgiev | |
| 8,155,478 B2 | 4/2012 | Vitsnudel et al. | |
| 2002/0159030 A1 | 10/2002 | Frey et al. | |
| 2003/0103670 A1 | 6/2003 | Schoelkopf et al. | |
| 2003/0117511 A1 | 6/2003 | Belz et al. | |
| 2003/0156077 A1 | 8/2003 | Balogh | |
| 2004/0114176 A1 | 6/2004 | Bodin et al. | |
| 2004/0257360 A1 | 12/2004 | Sieckmann | |
| 2005/0080602 A1 | 4/2005 | Snyder et al. | |
| 2006/0130017 A1 | 6/2006 | Cohen et al. | |
| 2007/0071316 A1 | 3/2007 | Kubo | |
| 2007/0230944 A1 | 10/2007 | Georgiev | |
| 2007/0252074 A1 | 11/2007 | Ng et al. | |
| 2008/0007626 A1 | 1/2008 | Wernersson | |
| 2008/0018668 A1 | 1/2008 | Yamauchi | |
| 2008/0129728 A1* | 6/2008 | Satoshi | 345/419 |
| 2008/0131019 A1 | 6/2008 | Ng | |
| 2008/0152215 A1 | 6/2008 | Horie et al. | |
| 2008/0168404 A1* | 7/2008 | Ording | 715/863 |
| 2008/0180792 A1 | 7/2008 | Georgiev | |
| 2008/0187305 A1 | 8/2008 | Raskar et al. | |
| 2008/0193026 A1 | 8/2008 | Horie et al. | |
| 2008/0226274 A1 | 9/2008 | Spielberg | |
| 2008/0266655 A1 | 10/2008 | Levoy et al. | |
| 2008/0309813 A1 | 12/2008 | Watanabe | |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev et al. | |
| 2009/0070710 A1* | 3/2009 | Kagaya et al. | 715/810 |
| 2009/0102956 A1 | 4/2009 | Georgiev | |
| 2009/0128658 A1 | 5/2009 | Hayasaka et al. | |
| 2009/0128669 A1 | 5/2009 | Ng et al. | |
| 2009/0140131 A1 | 6/2009 | Utagawa | |
| 2009/0185801 A1 | 7/2009 | Georgiev et al. | |
| 2009/0268970 A1 | 10/2009 | Babacan et al. | |
| 2009/0273843 A1 | 11/2009 | Raskar et al. | |
| 2009/0295829 A1 | 12/2009 | Georgiev et al. | |
| 2010/0026852 A1 | 2/2010 | Ng et al. | |
| 2010/0050120 A1* | 2/2010 | Ohazama et al. | 715/815 |
| 2010/0128145 A1 | 5/2010 | Pitts et al. | |
| 2010/0129048 A1 | 5/2010 | Pitts et al. | |
| 2010/0141802 A1 | 6/2010 | Knight et al. | |
| 2010/0201789 A1* | 8/2010 | Yahagi | 348/51 |
| 2010/0277629 A1 | 11/2010 | Tanaka | |
| 2011/0129165 A1 | 6/2011 | Lim et al. | |
| 2011/0267263 A1* | 11/2011 | Hinckley | 345/156 |
| 2012/0050562 A1 | 3/2012 | Perwass et al. | |
| 2012/0056889 A1* | 3/2012 | Carter et al. | 345/473 |
| 2012/0057806 A1* | 3/2012 | Backlund et al. | 382/286 |
| 2012/0132803 A1* | 5/2012 | Hirato et al. | 250/310 |
| 2012/0206574 A1* | 8/2012 | Shikata et al. | 348/46 |
| 2012/0249529 A1* | 10/2012 | Matsumoto et al. | 345/419 |
| 2012/0272271 A1* | 10/2012 | Nishizawa et al. | 725/40 |
| 2012/0287246 A1* | 11/2012 | Katayama | 348/46 |
| 2013/0044290 A1* | 2/2013 | Kawamura | 351/201 |
| 2013/0070059 A1* | 3/2013 | Kushida | 348/47 |
| 2013/0093844 A1* | 4/2013 | Shuto | 348/43 |
| 2013/0093859 A1* | 4/2013 | Nakamura | 348/51 |

FOREIGN PATENT DOCUMENTS

| | | |
|---|---|---|
| WO | 03052465 | 6/2003 |
| WO | 2006039486 | 4/2006 |
| WO | 2007092545 | 8/2007 |
| WO | 2007092581 | 8/2007 |

OTHER PUBLICATIONS

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modern method of achieving high performance and/or low cost imaging systems" SPIE Proceedings, vol. 3779, Jul. 1999, pp. 137-145.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Ives, H., "Optical properties of a Lippman lenticulated sheet," J. Opt. Soc. Am. 21, 171 (1931).

Jackson et al., "Selection of a Convolution Function for Fourier Inversion Using Gridding" IEEE Transactions on Medical Imaging, Sep. 1991, vol. 10, No. 3, pp. 473-478.

Levoy, M., et al., "Light Field Microscopy," ACM Transactions on Graphics, vol. 25, No. 3, Proceedings SIGGRAPH 2006.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Lippmann, "Reversible Prints", Communication at the French Society of Physics, Journal of Physics, Mar. 20, 1908, pp. 821-825.

Lumsdaine et al., "Full Resolution Lightfield Rendering" Adobe Technical Report Jan. 2008, pp. 1-12.

Naemura et al., "3-D Computer Graphics based on Integral Photography" Optics Express, Feb. 12, 2001. vol. 8, No. 2, pp. 255-262.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Okano et al., "Three-dimensional video system based on integral photograohy" Optical Engineering, Jun. 1999, vol. 38, No. 6, pp. 1072-1077.

Sokolov, "Autostereoscopy and Integral Photography by Professor Lippmann's Method", 1911, pp. 23-29.

Tanida et al., "Thin observation module by bound optics (TOMBO): concept and experimental verification" Applied Optics 40, 11 (Apr. 10, 2001), pp. 1806-1813.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

Vaish et al., "Using plane + parallax for calibrating dense camera arrays", in Proceedings CVPR 2004, pp. 2-9.

Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.

Adobe Systems Incorporated, "XMP Specification", Sep. 2005.

Fitzpatrick, Brad, "Camlistore", Feb. 1, 2011.

(56) References Cited

OTHER PUBLICATIONS

Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.

Adobe, "Photoshop CS6 / in depth: Digital Negative (DNG)", http://www.adobe.com/products/photoshop/extend.displayTab2html. Retrieved Jan. 2013.

TechCrunch, "Cooliris". Retrieved Jan. 2013.

Georgiev, T., et al., Plenoptic Camera 2.0 (2008).

Georgiev, T., et al., "Unified Frequency Domain Analysis of Lightfield Cameras" (2008).

Mallat, Stephane, "A Wavelet Tour of Signal Processing", Academic Press 1998.

Nakamura, J., "Image Sensors and Signal Processing for Digital Still Cameras" (Optical Science and Engineering), 2005.

Ogden, J., "Pyramid-Based Computer Graphics", 1985.

SimpleViewer, "Tiltview", http://www.simpleviewer.net/tiltviewer. Retrieved Jan. 2013.

Snavely, Noah, et al., "Photo tourism: Exploring photo collections in 3D", ACM Transactions on Graphics (SIGGRAPH Proceedings), 2006.

Story, D., "The Future of Photography", Optics Electronics, Oct. 2008.

Design of the xBox menu. Retrieved Jan. 2013.

Portable Network Graphics format: http://en.wikipedia.org/wiki/Portable_Network_Graphics. Retrieved Jan. 2013.

Exchangeable image file format: http://en.wikipedia.org/wiki/Exchangeable_image_file_format. Retrieved Jan. 2013.

Extensible Metadata Platform: http://en.wikipedia.org/wiki/Extensible_Metadata_Platform. Retrieved Jan. 2013.

Compression standard JPEG XR: http://en.wikipedia.org/wiki/JPEG_XR. Retrieved Jan. 2013.

Methods of Variable Bitrate Encoding (http://en.wikipedia.org/wiki/Variable_bitrate#Methods_of_VBR_encoding). Retrieved Jan. 2013.

Lazy loading of image data (http://en.wikipedia.org/wiki/Lazy_loading). Retrieved Jan. 2013.

Key framing for video animation (http://en.wikipedia.org/wiki/Key_frame). Retrieved Jan. 2013.

Data overlay techniques for real-time visual feed. For example, heads-up displays (http://en.wikipedia.org/wiki/Head-up_display). Retrieved Jan. 2013.

Autofocus systems and methods (http://en.wikipedia.org/wiki/Autofocus). Retrieved Jan. 2013.

Williams, L., "Pyramidal Parametrics", Computer Graphics (1983).

\* cited by examiner

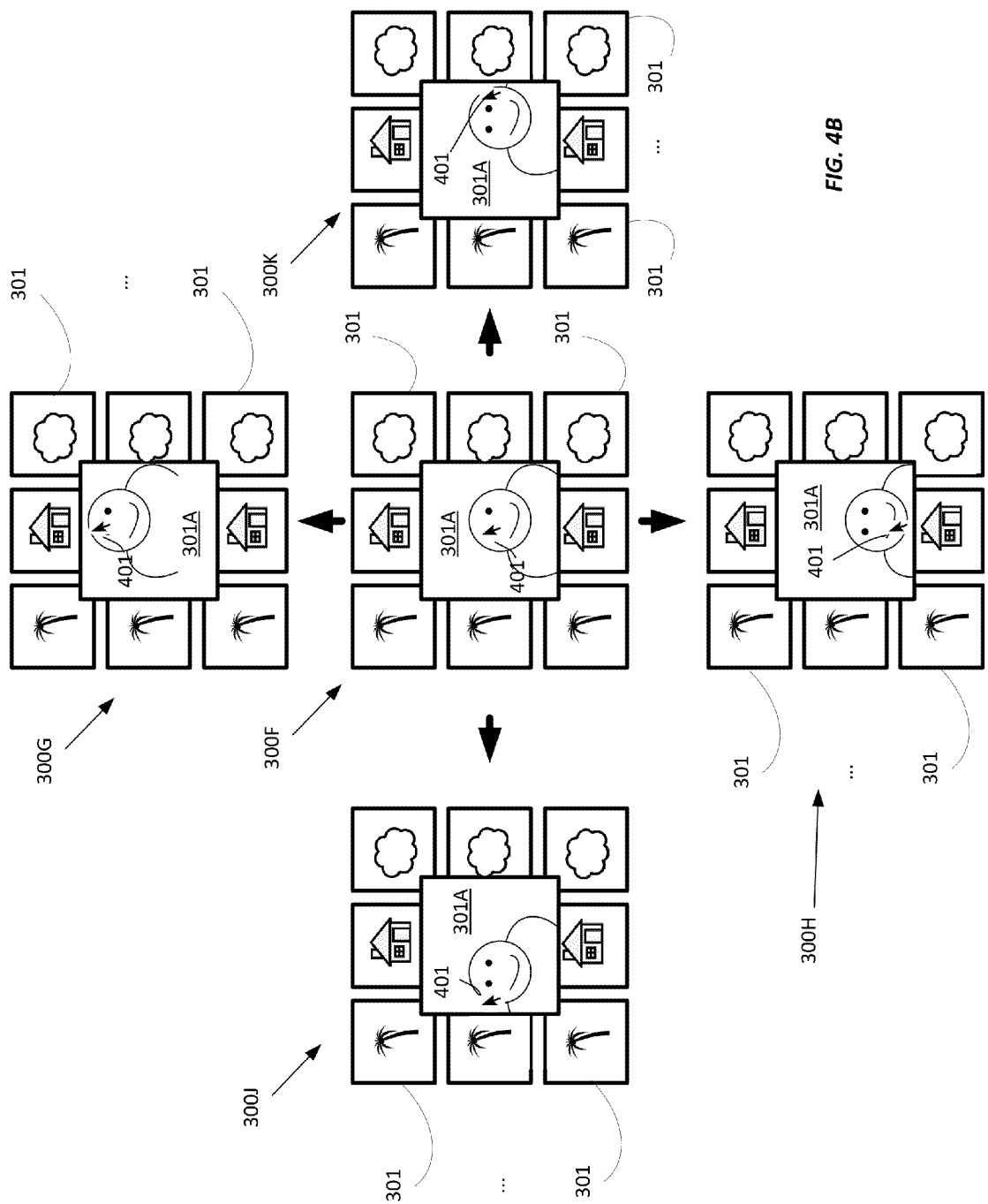

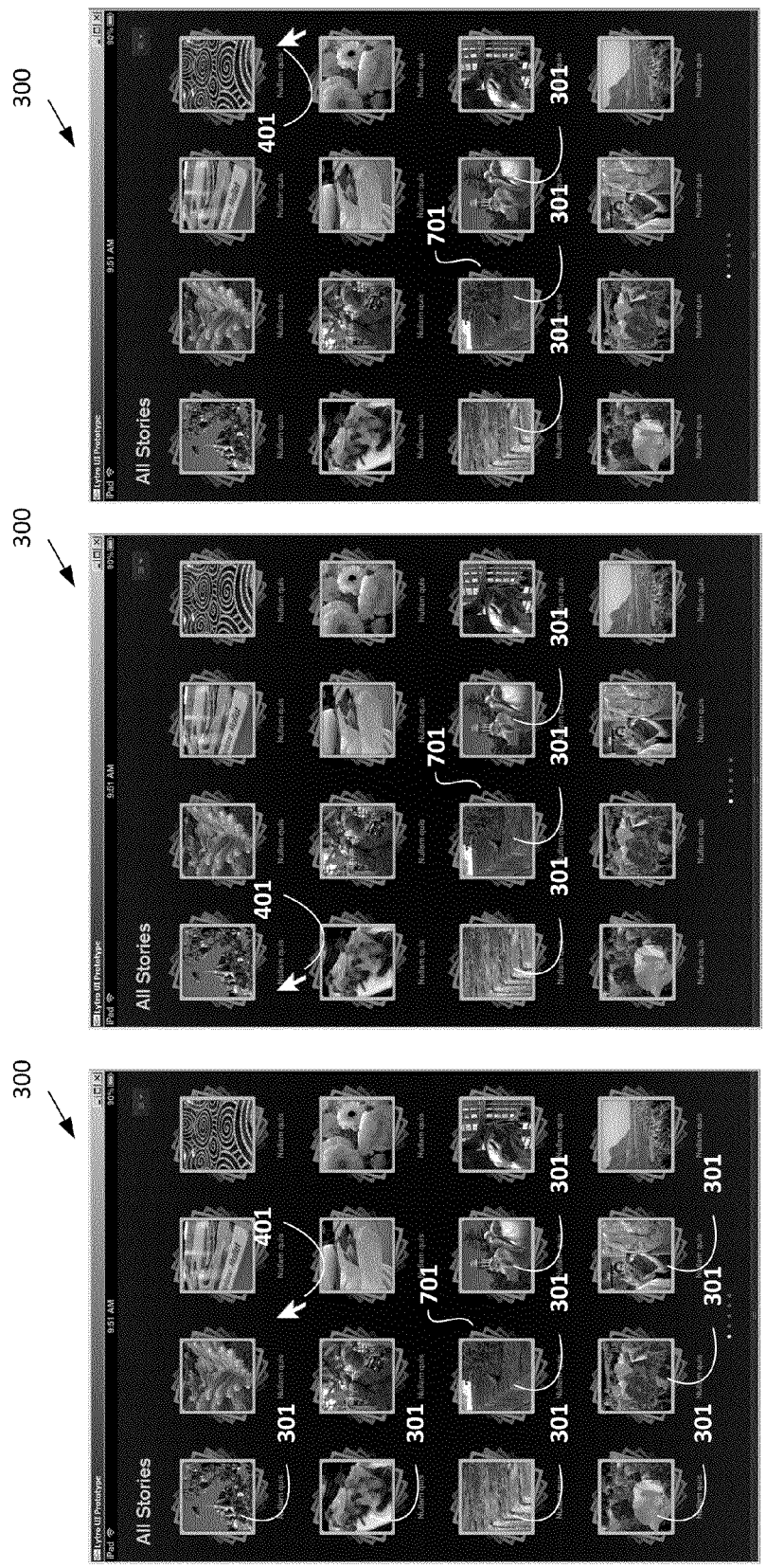

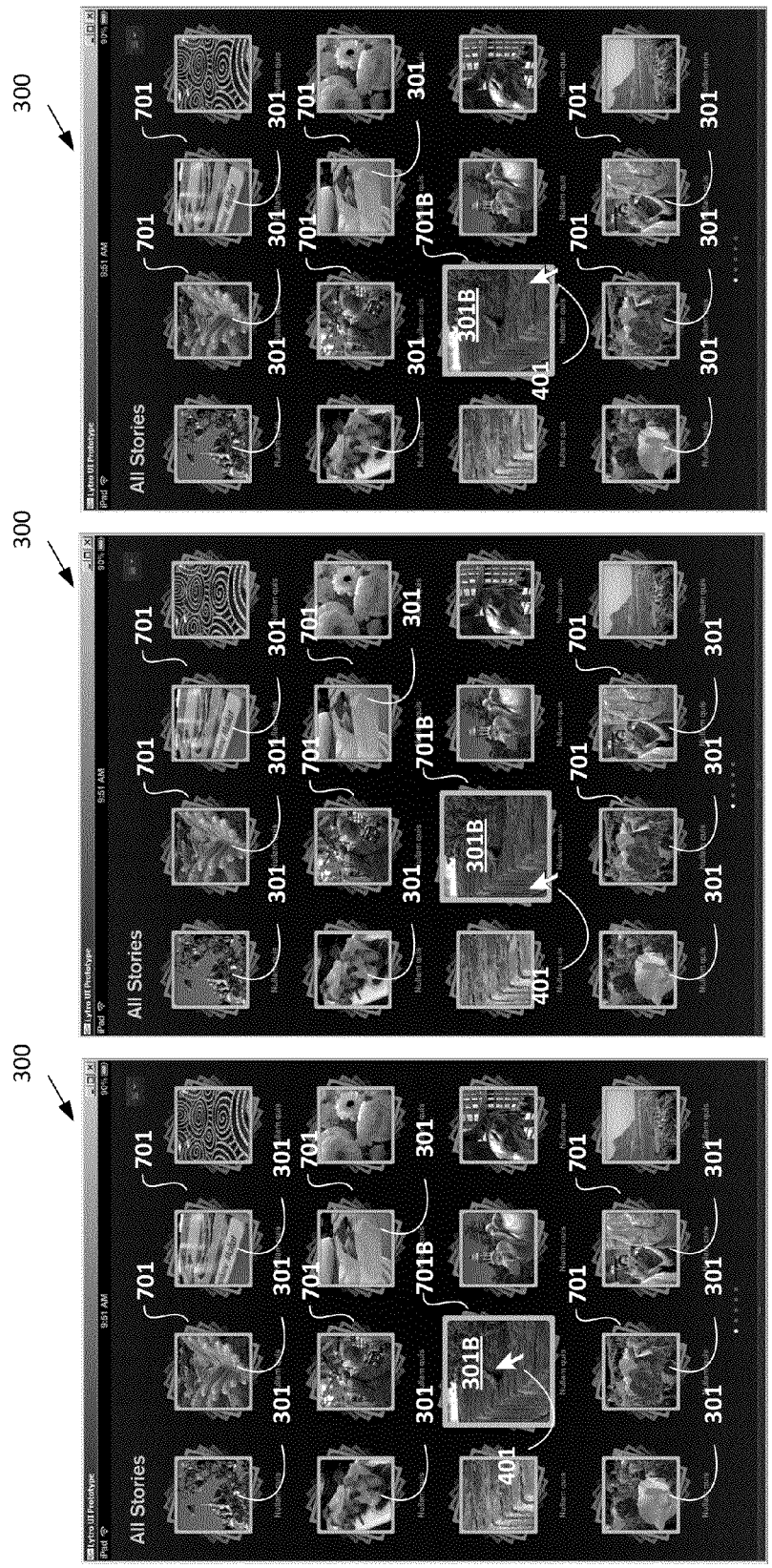

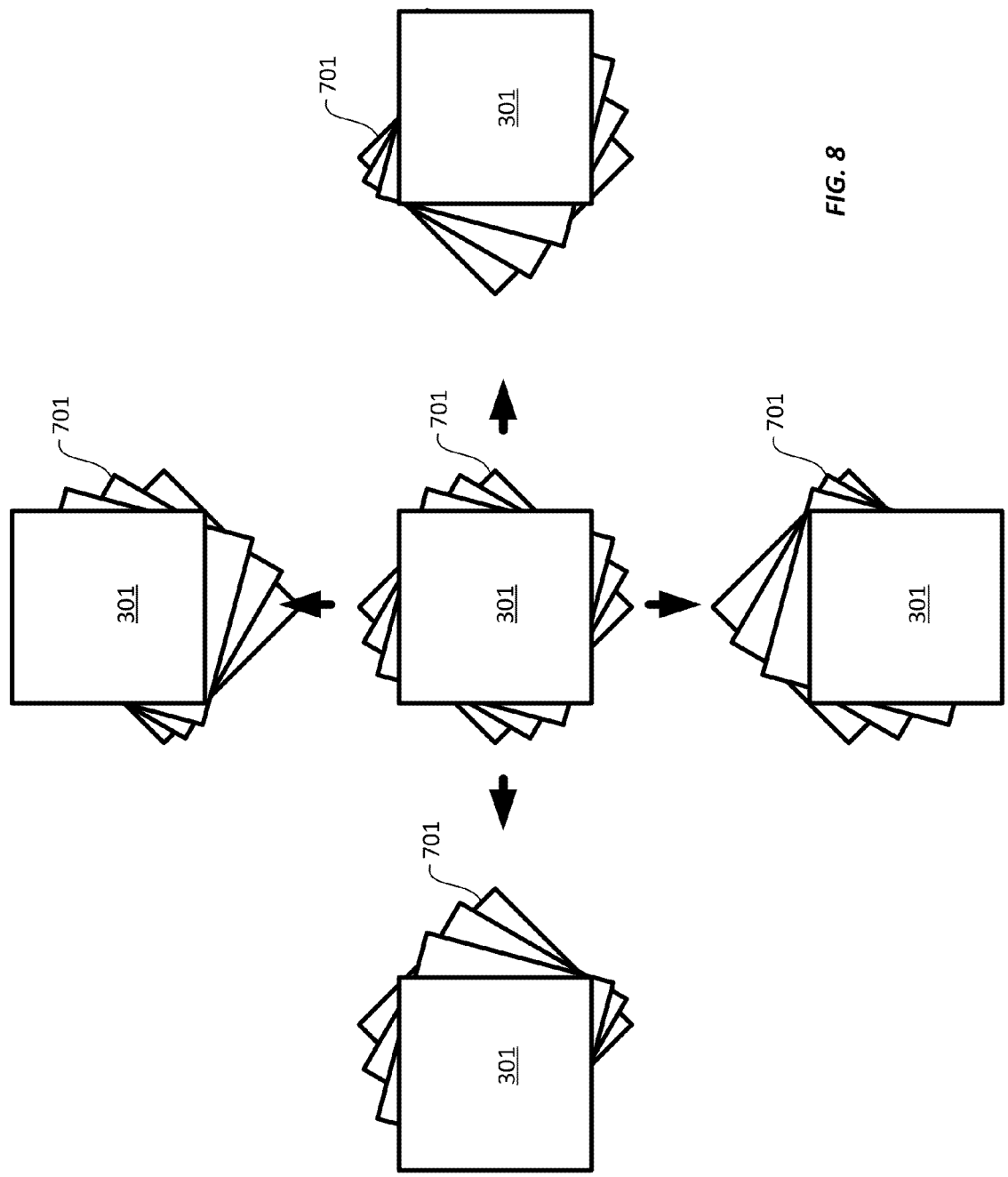

PARALLAX AND/OR THREE-DIMENSIONAL EFFECTS FOR THUMBNAIL IMAGE DISPLAYS

CROSS-REFERENCE TO RELATED APPLICATIONS

The present application is related to U.S. Utility application Ser. No. 11/948,901 for "Interactive Refocusing of Electronic Images," filed Nov. 30, 2007, the disclosure of which is incorporated herein by reference.

The present application is further related to U.S. Utility application Ser. No. 12/632,979 for "Light-field Data Acquisition Devices, and Methods of Using and Manufacturing Same," filed Dec. 8, 2009, the disclosure of which is incorporated herein by reference.

The present application is further related to U.S. Utility application Ser. No. 12/703,367 for "Light-field Camera Image, File and Configuration Data, and Method of Using, Storing and Communicating Same," filed Feb. 10, 2010, which issued on Oct. 16, 2012 as U.S. Pat. No. 8,289,440, the disclosure of which is incorporated herein by reference.

The present application is further related to U.S. Utility application Ser. No. 13/027,946 for "3D Light Field Cameras, Images and Files, and Methods of Using, Operating, Processing and Viewing Same," filed Feb. 15, 2011, the disclosure of which is incorporated herein by reference.

The present application is further related to U.S. Utility application Ser. No. 13/155,882 for "Storage and Transmission of Pictures Including Multiple Frames," filed Jun. 8, 2011, the disclosure of which is incorporated herein by reference.

FIELD OF THE INVENTION

The present invention relates to interactive displays of multiple images, such as thumbnail images.

BACKGROUND

Interactive displays of multiple images are quite common in today's user interfaces. One context in which such interactive displays are used is in the presentation of thumbnail images, which can be used to provide a user with a quick view of many images concurrently. Each thumbnail image is a reduced-size representation of an image; by presenting the images at reduced size, user interfaces are able to include many such images within a limited space such as a display window as presented on a display screen. The display of thumbnail images can be used to navigate among full-sized versions of the images.

FIG. 1 depicts a typical display 100 of thumbnail images 301 as presented in the context of an operating system window for viewing representations of files according to the prior art. Here, each thumbnail 301 represents a file containing image data, and the thumbnail 301 is presented as a reduced-size representation of the image data. Such a display allows a user to easily associate manipulable elements (thumbnails 301) with the underlying data that they represent, thus improving operation of direct-manipulation user interfaces. Thumbnails 301 also avoid the need for users to open and view full images one by one merely to determine which element represents which image. In many contexts, users can move, drag, scroll, and otherwise manipulate thumbnails 301 in a manner similar to the manipulation of on-screen icons; in fact, many existing user interfaces for operating systems now employ thumbnails 301 to replace or supplement icons in their interactive displays, particularly for files that represent visual data such as images.

Certain types of special effects can be applied to thumbnails 301. For example, it is known to provide animated thumbnails 301; one application is for thumbnails 301 representing video files, which may animate to show different frames within the video file. It is also known to present thumbnails 301 that change appearance when selected or highlighted, or when a user causes an on-screen cursor to hover over the thumbnail 301.

SUMMARY

According to various embodiments of the invention, a system and method are provided for adding parallax and/or three-dimensional effects to thumbnail image displays.

Various types of effects can be applied in connection with the present invention. In at least one embodiment, parallax and/or three-dimensional effects are applied in such a manner that the thumbnail images appear to respond to their display environment. For example, a parallax effect can be applied that responds to current cursor position, scroll position, scroll velocity, orientation of the display device (detected, for example, by position- and/or motion-sensing mechanisms), and/or any other environmental conditions. As another example, thumbnail images can be refocused, and/or a viewpoint for an image can be adjusted, in response to a user clicking on or tapping on particular elements within such images, as an extension to the mechanism described in related U.S. Utility application Ser. No. 11/948,901 for "Interactive Refocusing of Electronic Images," filed Nov. 30, 2007, the disclosure of which is incorporated herein by reference.

In at least one embodiment, one thumbnail (or a subset of displayed thumbnails) may be highlighted or selected. The highlighted or selected thumbnail may be displayed in a manner that is distinctive from other displayed thumbnails, for example by being presented in a larger size, possibly overlapping other thumbnails. In at least one embodiment, a parallax and/or three-dimensional effects can be applied to the highlighted or selected thumbnail in a manner that reinforces the notion that a highlighted or selected thumbnail is positioned "above" (closer to the viewer than) other thumbnails. In at least one embodiment, parallax and/or three-dimensional effects can be applied only to a highlighted or selected thumbnail, and not to other displayed thumbnails; in another embodiment, such effects are presented in a manner that is more (or less) pronounced for a highlighted or selected thumbnail than for other thumbnails.

In at least one embodiment, parallax and/or three-dimensional effects can be applied to framing elements or other components that are displayed in association with thumbnail images. Again, such effects can respond to user action such as reorientation of the device, cursor repositioning, scrolling, and/or the like. Application of such effects to framing elements or other components can be performed instead of or in addition to application of such effects to the thumbnail images themselves. Any suitable combination of such effects can be implemented.

Accordingly, in various embodiments of the present invention, parallax and/or three-dimensional effects are applied in connection with interactive displays of thumbnail images, in a manner that improves interactivity and feedback, and provides a user with a more enriching experience. Such effects improve the overall user experience by reinforcing the interactivity of the display and by providing subtle cues that reinforce the notion that the displayed thumbnail images are manipulable and selectable, and that the user's input is being properly recognized and interpreted.

The present invention also provides additional advantages, as will be made apparent in the description provided herein.

In at least one embodiment, the displayed thumbnail images are light-field images or other images that can be viewed from different viewpoints so as to provide a parallax effect. Any number of rendered images can be generated from a light-field image, each such rendered image being associated with a different viewpoint. Objects represented in the light-field image may be at different depths, wherein the depth of an object can represent: a) its distance from an image capture apparatus; b) its distance relative to an output display device; or c) its distance relative to a person viewing the light-field image. Accordingly, for each rendered image that can be generated from a light-field image, the perceived relative movement of objects at different depths can produce a parallax effect; specifically, those objects having a depth closer to the viewer may shift more than those objects that are farther away. Images can also be refocused at different depths to reinforce the notion that different objects are located at different depths. In at least one embodiment, thumbnail images as a whole can be positioned at different depths from one another. Thus, a shift in depth can be applied to either the content of a rendered image, or the rendered image itself, or both.

In at least one embodiment, the system and method of the present invention are operable to provide parallax and/or three-dimensional effects to thumbnail images whether or not such images are based on light-field pictures. For example, such effects can be applied to conventional two-dimensional thumbnail images. The techniques described herein can also be applied to display elements such as icons which do not necessarily include an image component. For example, according to the techniques described herein, parallax and/or three-dimensional effects can be applied to a screen for presenting a number of icons for selecting files, applications, documents, and/or the like. However, for ease of nomenclature, the invention is described herein as it applies to thumbnail images.

Although the techniques described herein are applicable to thumbnail images that are derived from light-field images or light-field pictures captured on an image capture device having a microlens array using light-field photography, one skilled in the art will recognize that such techniques can be implemented in connection with any type of pictures that contain depth information, including those that are generated using methods other than light-field photography. For example, and without limitation, the techniques described herein can be applied to any or all of: computer generated images; images that are originally two-dimensional but that have been manually or automatically enhanced with depth information; hand-drawn images; images that are captured stereoscopically and/or from multiple devices; images captured by grid-array cameras, and/or the like. In addition, in at least one embodiment, the techniques described herein can be implemented in connection with images having no depth component.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 4B depicts an example of application of a parallax effect to a single highlighted thumbnail image, in response to changes in cursor position, according to one embodiment.

FIGS. 7A through 7F depict an example of application of a parallax effect to thumbnail images and their framing elements, including a highlighted thumbnail image, according to one embodiment.

FIG. 8 depicts an example of application of a parallax effect to framing elements of a single thumbnail image, in response to changes in cursor position, according to one embodiment.

DETAILED DESCRIPTION OF THE EMBODIMENTS

Terminology

Figure 1:
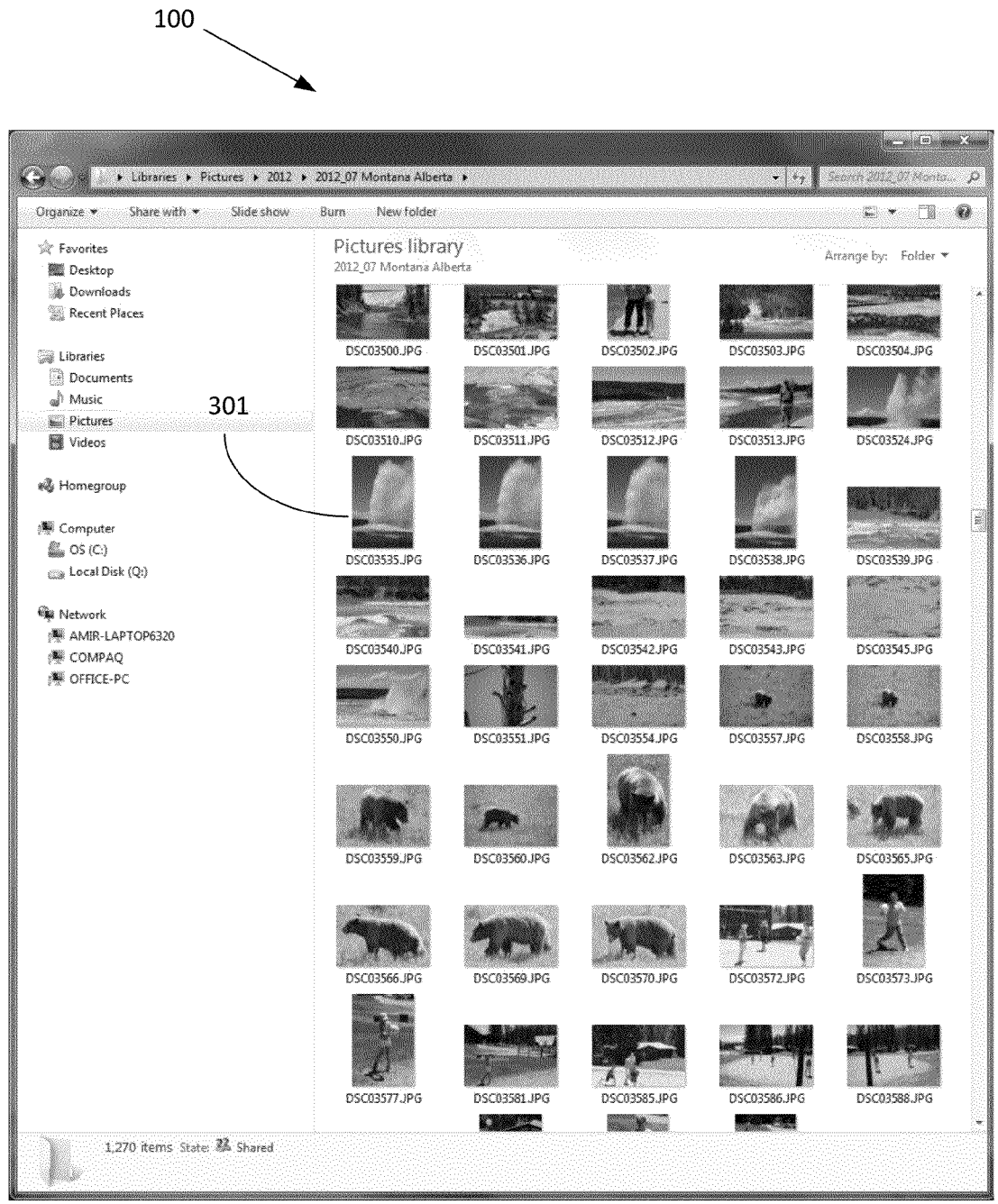
FIG. 1 depicts an example of a display of thumbnail images according to the prior art.

The following terms are defined for purposes of the description provided herein:

Light-field: a collection of rays. A ray's direction specifies a path taken by light, and its color specifies the radiance of light following that path.

Light-field image: a two-dimensional image that spatially encodes a four-dimensional light field. The sensor image from a light field camera is a light field image.

Light-field picture: any representation of a four-dimensional light-field, such as for example a two-dimensional image containing directional information for light rays. The sensor data captured by a light-field camera is representative of a light-field picture.

Device: any electronic device capable of capturing, acquiring, processing, transmitting, receiving, and/or displaying pictures and/or image data.

Rendered image (or projected image): any image that has been generated from a depth-enhanced picture (such as a light-field picture), for example by rendering the depth-enhanced picture at a particular depth, viewpoint, and/or focal distance.

User, end user, viewer, end viewer: These are terms that are used interchangeably to refer to the individual or entity to whom a rendered image is presented.

Parallax shift: Refers to the phenomenon by which an apparent viewpoint for an image can change, thus simulating an actual change in appearance that might appear in response to a change in viewing angle. For purposes of the description herein, "parallax shift" is equivalent to "viewpoint change".

Lambda (depth): A measure of depth within a scene. For example, a zero-parallax lambda represents a value of lambda indicating distance (depth) with respect to the plane of the monitor on which the image is being displayed.

For illustrative purposes, the techniques of the present invention are described herein in terms of light-field images that may be captured and stored by an image capture device such as a light-field camera. However, the techniques can be implemented using any images from any suitable source, including but not limited to images acquired by or generated by any device or system for acquiring, recording, measuring, estimating, determining and/or computing data representative of a scene, including but not limited to two-dimensional image data, three-dimensional image data, picture data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to application to images captured by cameras. Thus, the use of the term "camera" herein is intended to be illustrative and exemplary, but should not be considered to limit the scope of the invention. Specifically, any use of such term herein should be considered to refer to any suitable data acquisition device.

In fact, in some embodiments, the techniques of the present invention can be applied to computer generated images, hand drawn images, icons, drawings, computer enhanced images, text, symbols, graphics, and/or any other visual element or elements, or suitable combination thereof. Thus, the use of the term "image" or "image element" herein is intended to exemplary and not limiting.

System Architecture

Figure 2A:
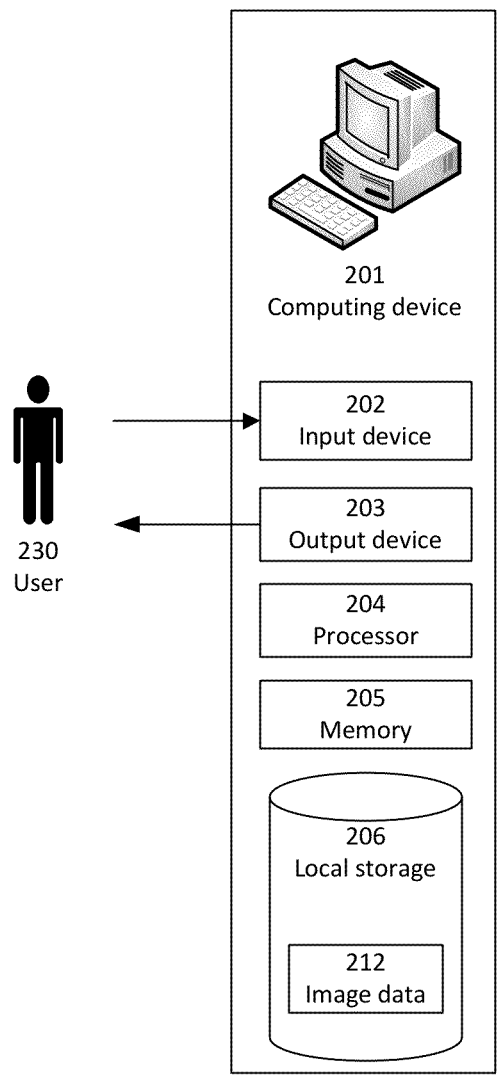
FIG. 2A depicts an architecture for implementing the present invention in a stand-alone computing device, according to one embodiment.

Referring now to FIG. 2A, there is shown a block diagram depicting a hardware architecture for practicing the present invention according to one embodiment. Such an architecture can be used, for example, for implementing the techniques of the present invention in connection with a stand-alone software application running on a computer. Computing device 201 may be any electronic device adapted to run software; for example, computing device 201 may be a desktop computer, laptop computer, personal digital assistant (PDA), camera, cellular telephone, smartphone, music player, handheld computer, tablet computer, kiosk, game system, set-top box, or the like. In at least one embodiment, computing device 201 is a desktop computer running an operating system such as Microsoft Windows, available from Microsoft Corporation of Redmond, Wash., or Mac OS X, available from Apple Inc. of Cupertino, Calif., or iOS, available from Apple Inc. of Cupertino, Calif.

The techniques of the present invention can be implemented as part of a software application and/or operating system running on computing device 201 according to well-known techniques. The software application may be a desktop application or a web-based application that is accessible via a browser such as Microsoft Internet Explorer, available from Microsoft Corporation of Redmond, Wash., or by a specialized web-based client application.

In at least one embodiment, computing device 201 comprises a number of hardware components as are well known to those skilled in the art. Input device 202 can be a keyboard, mouse, touchscreen, trackball, trackpad, five-way switch, voice input device, joystick, eye tracker, motion sensing device (such as Kinect, available from Microsoft Corporation of Redmond, Wash., or Leap Motion, available from Leap Motion of San Francisco, Calif.), web camera, electroencephalography-based brain-computer interface (such as Emotiv EPOC, available from Emotiv Systems of Australia), and/or any combination thereof. Output device 203 can be a display screen, speaker, printer, and/or any combination thereof. Processor 204 can be a conventional microprocessor for performing operations on data under the direction of software, according to well-known techniques. Memory 205 can be random-access memory having a structure and architecture as are known in the art, for use by processor 304 in the course of running software. Local storage 206 can be any magnetic, optical, and/or electrical storage device for storage of data in digital form; examples include flash memory, magnetic hard drive, CD-ROM, DVD-ROM, and/or the like. In at least one embodiment, local storage 206 includes image data 212, which may store pictures and/or images using any suitable format, whether compressed or uncompressed; in at least one embodiment, image data 212 includes data files representing depth-enhanced pictures and/or light-field pictures.

In at least one embodiment, the techniques of the present invention can be applied to three-dimensional images displayed on a three-dimensional screen. Thus, output device 203 can be a screen adapted to the display of three-dimensional objects. As described in more detail herein, thumbnail images may be implemented as light-field images having a depth component, so that such a three-dimensional device can accurately depict objects within the light-field images at appropriate depths.

One skilled in the art will recognize that the particular arrangement of hardware elements shown in FIG. 2A is merely exemplary, and that the invention can be implemented using different hardware elements configured in any of a number of different ways. Thus, the particular architecture shown in FIG. 2A is merely illustrative and is not intended to limit the scope of the invention in any way.

Figure 2B:
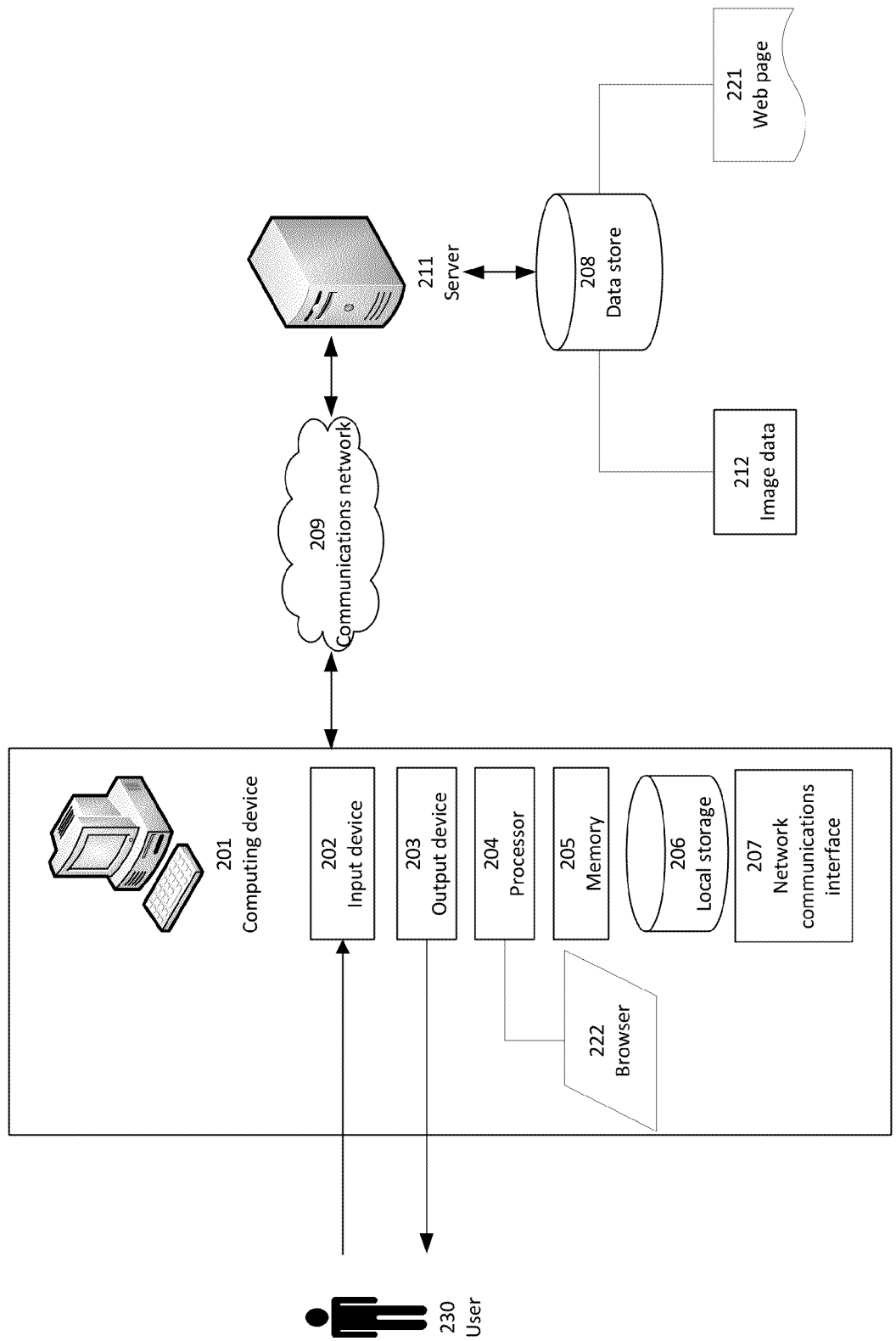
FIG. 2B depicts an architecture for implementing the present invention in a client/server environment, according to one embodiment.

Referring now to FIG. 2B, there is shown a block diagram depicting a hardware architecture for practicing the present invention in a client/server environment according to one embodiment of the present invention. Such an architecture can be used, for example, for implementing the techniques of the present invention in connection with a web page, such as for example a web page containing a plurality of thumbnail images. Processor 204 runs browser 222 software according to well known mechanisms. Browser 222 may be any conventional browser, such as Microsoft Internet Explorer, available from Microsoft Corporation of Redmond, Wash.

Network communications interface 207 is an electronic component that facilitates communication of data to and from other computing devices over communications network 209. Communications network 209 can be the Internet or any other electronic communications network.

Server 211 communicates with computing device 201 over network 209, and in various embodiments can be located remotely or locally with respect to computing device 201. In at least one embodiment, server 211 is associated with data store 208, which can act as a repository for web-based resources such as web pages 221. In at least one embodiment, data store 208 also includes image data 212, which may store pictures and/or images using any suitable format, whether compressed or uncompressed; in at least one embodiment, image data 212 includes data files representing depth-enhanced pictures and/or light-field pictures. Image data 212 can be located at server 211 or at computing device 201. In at least one embodiment, image data 212 (or some portion thereof) can be transmitted to computing device 201 as part of a client/server session, and stored in a cache implemented in local storage 206, to improve responsiveness while user 230 interacts with computing device 201.

In at least one embodiment, in response to requests from computing device 201, server 211 transmits web pages 221 to computing device 201 over network 209. Any or all of such web pages 221 may contain code, such as JavaScript code for execution on computing device 201, for implementing the techniques of the present invention via browser 222. Alternatively, the software code for implementing the techniques of the present invention may reside at computing device 201. One skilled in the art will recognize that the present invention may be implemented using a distributed software architecture if appropriate. One skilled in the art will further recognize that the client/server architecture shown in FIG. 2B is merely exemplary, and that other architectures can be used to implement the present invention, including architectures that are not necessarily web-based. Thus, the particular architecture shown in FIG. 2B is merely illustrative and is not intended to limit the scope of the invention in any way.

One skilled in the art will recognize that the particular arrangement of hardware elements shown in the Figures is merely exemplary, and that the invention can be implemented using different hardware elements configured in any of a number of different ways.

Shifting Parallax in Response to User Input

In at least one embodiment, a parallax effect is applied in such a manner that the thumbnail images appear to respond to their display environment. For example, a parallax effect can be applied that responds to current cursor position, scroll position, scroll velocity, orientation of the display device (detected, for example, by position- and/or motion-sensing mechanisms), and/or any other environmental conditions.

Figure 3A:
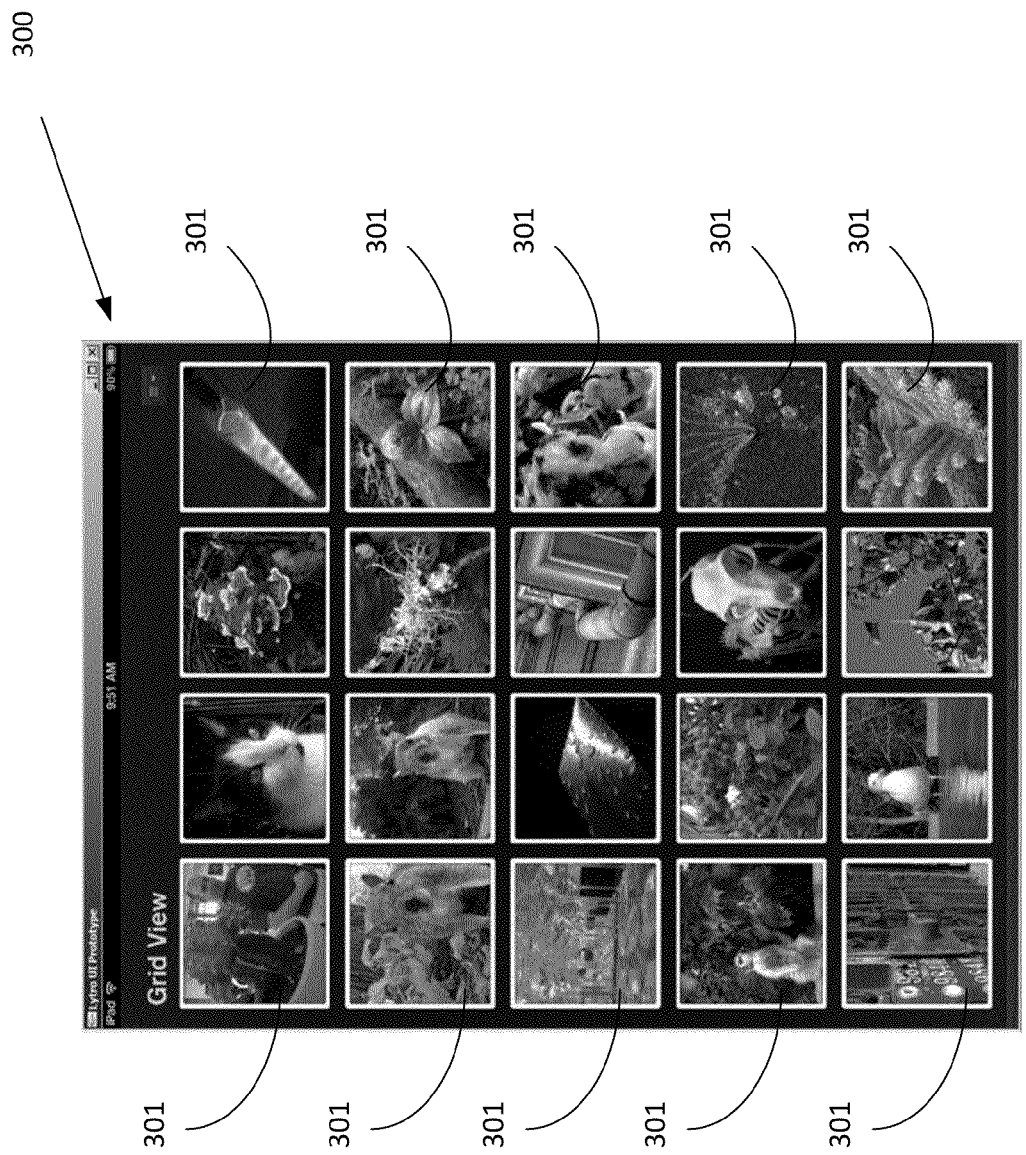
FIGS. 3A through 3G depict an example of application of a parallax effect to a set of displayed thumbnail images, including a highlighted thumbnail image, according to one embodiment.

Referring now to FIG. 3A, there is shown a screen shot depicting an example of a display 300 according to one embodiment, as it might be presented on an output device 203 such as a display screen of computing device 201. Display 300 includes any number of thumbnail images 301, which may be arranged in a grid or any other suitable arrangement. As is known in the art, thumbnail images 301 may be user-selectable and/or user-manipulable; for example, a user may provide input via input device 202 to cause thumbnail images 301 to move, or to select a particular thumbnail image 301 to expand in size. Thumbnail images 301 may also be selectable and/or activatable to provide access to corresponding full-size images, or to videos, applications, documents, or other resources. For example, in an embodiment where output device 203 is a touch-sensitive screen, user 230 can tap on a thumbnail 301 to gain access to a full-sized version of the corresponding image, or to activate a corresponding video, application, document, or the like. In other embodiments, user 230 can select and/or activate a thumbnail 301 using any suitable input device 202 such as a mouse, keyboard, trackball, and/or the like.

In at least one embodiment, in response to certain trigger events, a parallax effect is applied to cause the viewpoint for each displayed thumbnail image 301 to appear to shift. The parallax shift can be in any suitable direction and magnitude. In at least one embodiment, objects within the thumbnail image are made to shift in position with respect to the edges of the thumbnail image. Furthermore, in at least one embodiment, objects within the thumbnail image are made to shift in position with respect to one another, so as to reinforce the impression that different objects in the image have different depths; for example, objects at a shorter depth can be made to shift more than objects at greater depth.

In at least one embodiment, the parallax shift is performed in response to some change in the display environment and/or in response to user input. For example, the parallax shift can be performed in response to user 230 movement of an on-screen cursor or in response to user movement of a contact point on a touch-sensitive screen. Thus, as user 230 causes the cursor (or contact point) to move in a particular direction, a parallax shift in that direction can be performed, causing objects within thumbnail images 301 to move in that direction, at the same rate as one another or at different rates depending on object depth. In at least one embodiment, the parallax shift is performed to the same degree on all displayed thumbnail images 301. In at least one other embodiment, the parallax shift can be performed to different degrees depending on, for example, the proximity of a particular thumbnail image 301 to the current position of the cursor; for example, the effect can be greater for those thumbnails 301 that are closest to the current position of the cursor.

Figure 4A:
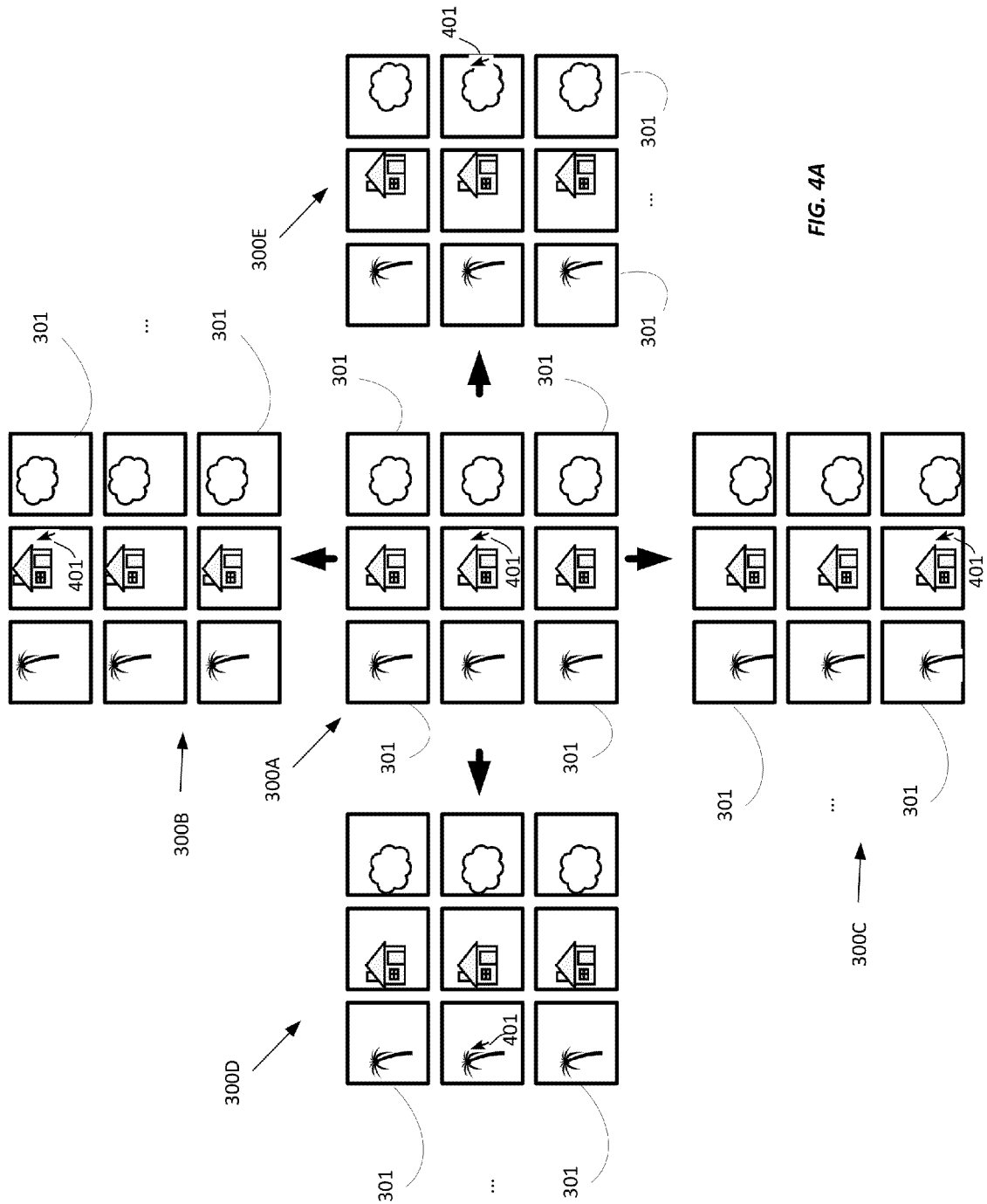
FIG. 4A depicts an example of application of a parallax effect to a set of thumbnail images, in response to changes in cursor position, according to one embodiment.

Referring now to FIG. 4A, there is shown an example of parallax shift being performed in response to user 230 movement of an on-screen cursor 401. FIG. 4A depicts five different versions of a display 300 containing thumbnail images 301. In initial version 300A, cursor 401 is positioned near the center of display 300A, and each thumbnail image 301 is shown from a viewpoint that places its content at an initial position that is relatively central with respect to the edges of the thumbnail image 301. In other versions 300B through 300E, cursor 401 has moved to different positions within display 300, and the viewpoints of the thumbnail images 301 are adjusted according to the movement of cursor 401. For example, in version 300B, cursor 401 has moved upward; accordingly, the viewpoints of thumbnail images 301 are shifted upward, applying a parallax effect that causes the content of each thumbnail image 301 to move closer to its upper edge. In version 300E, cursor 401 has moved to the right; accordingly, the viewpoints of thumbnail images 301 are shifted rightward, applying a parallax effect that causes the content of each thumbnail image 301 to move closer to its right edge.

In various embodiments, the parallax shift can be performed responsive to absolute position of cursor 401 (or contact point), or responsive to the direction and speed of movement of cursor 401 (or contact point), or some combination thereof. For example, in at least one embodiment, parallax is shifted for all displayed thumbnail images 301 while cursor 401 (or contact point) is being moved, and the degree of the parallax shift is responsive to the speed of cursor 401 movement; thumbnail images 301 return to their original viewpoint when cursor 401 movement stops. In at least one other embodiment, parallax is shifted based on cursor 401 position, not movement, so that thumbnail images 301 do not return to their original viewpoint when cursor 401 stops moving.

In at least one embodiment, one thumbnail 301 (or a subset of displayed thumbnails 301) may be highlighted or selected. The highlighted or selected thumbnail 301 may be displayed in a manner that is distinctive from other displayed thumbnails 301, for example by being presented in a larger size, possibly overlapping other thumbnails 301. In at least one embodiment, a parallax and/or three-dimensional effects can be applied to the highlighted or selected thumbnail 301 in a manner that reinforces the notion that a highlighted or selected thumbnail 301 is positioned "above" (closer to the viewer than) other thumbnails 301. In at least one embodiment, parallax and/or three-dimensional effects can be applied only to a highlighted or selected thumbnail 301, and not to other displayed thumbnails 301; in another embodiment, such effects are presented in a manner that is more (or less) pronounced for a highlighted or selected thumbnail 301 than for other thumbnails 301.

Figure 3C:
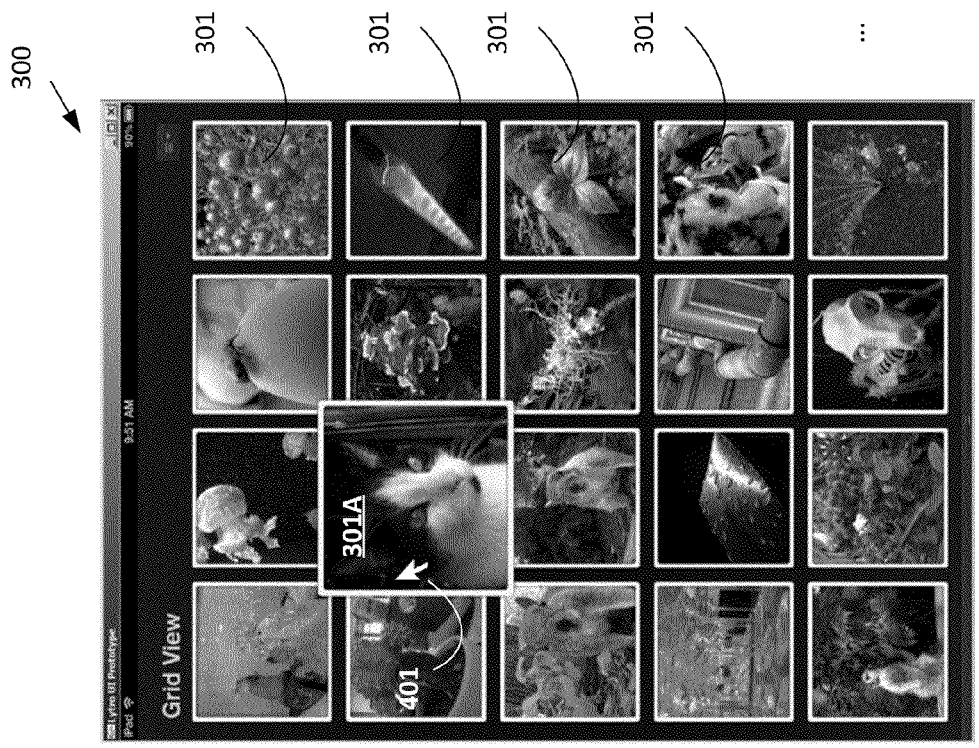
Figure 3B:
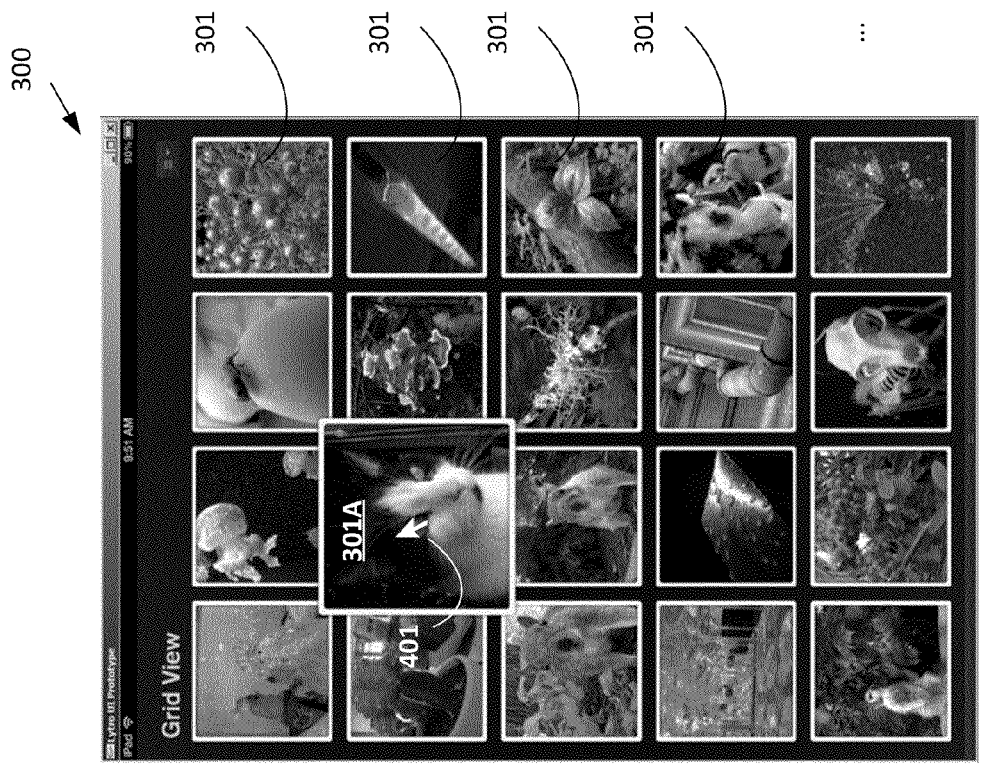

Referring now to FIG. 3B, there is shown a screen shot depicting an example of a display 300 similar to that shown in FIG. 3A; however, in this example, one thumbnail 301A has been highlighted, for example in response to the user causing cursor 401 to hover over thumbnail 301A, or by clicking on thumbnail 301A, or by positioning a finger on thumbnail 301A (in an embodiment using a touch-sensitive screen), or by some other means. Thumbnail 301A is enlarged with respect to other thumbnails 301, to indicate its highlighted state; in fact, in this example, thumbnail 301A has been enlarged to an extent that it overlaps its neighboring thumbnails 301. One skilled in the art will recognize that enlargement of a thumbnail 301 is merely one way to highlight it, and that many other mechanisms are available. For example, a highlighted thumbnail 301 may be shown in color while others are black and white, and/or its appearance can be enhanced, brightened, or otherwise adjusted, and/or its frame can be shown in a different color or in some other visually distinctive way, or the like.

In at least one embodiment, a parallax effect is applied differently to a highlighted thumbnail 301 (such as thumbnail 301A) than to other thumbnails 301. For example, when a thumbnail 301 is highlighted, the parallax shift can be applied only to highlighted thumbnail 301A and not to other thumbnails 301. Alternatively, the parallax shift can be applied to a greater degree to highlighted thumbnail 301A and to a lesser degree to other thumbnails 301.

Referring now to FIG. 3C, there is shown a screen shot depicting an example of a display 300 after cursor 401 has been moved to the left but is still hovering over thumbnail 301A. Thus, thumbnail 301A is still highlighted, but it is shown from a different viewpoint, causing a parallax shift to the left in response to the movement of cursor 401. In at least one embodiment, the parallax shift is not so pronounced as to make it appear that the underlying content is being dragged by cursor 401. In at least one embodiment, other, non-highlighted thumbnails 301 are unaffected by the movement of cursor 401 within highlighted thumbnail 301A. In other embodiments, as described above, a parallax shift can be applied to the other, non-highlighted thumbnails 301, possibly to a reduced extent than the shift that is applied to highlighted thumbnail 301A.

Figure 3E:
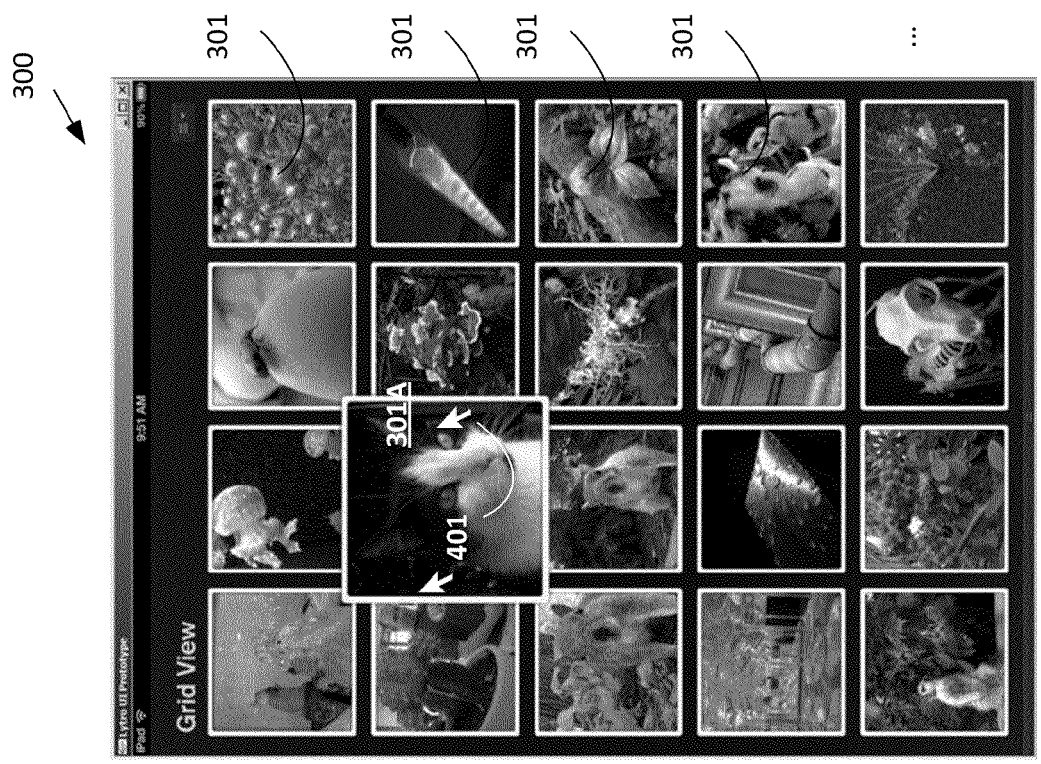
Figure 3D:
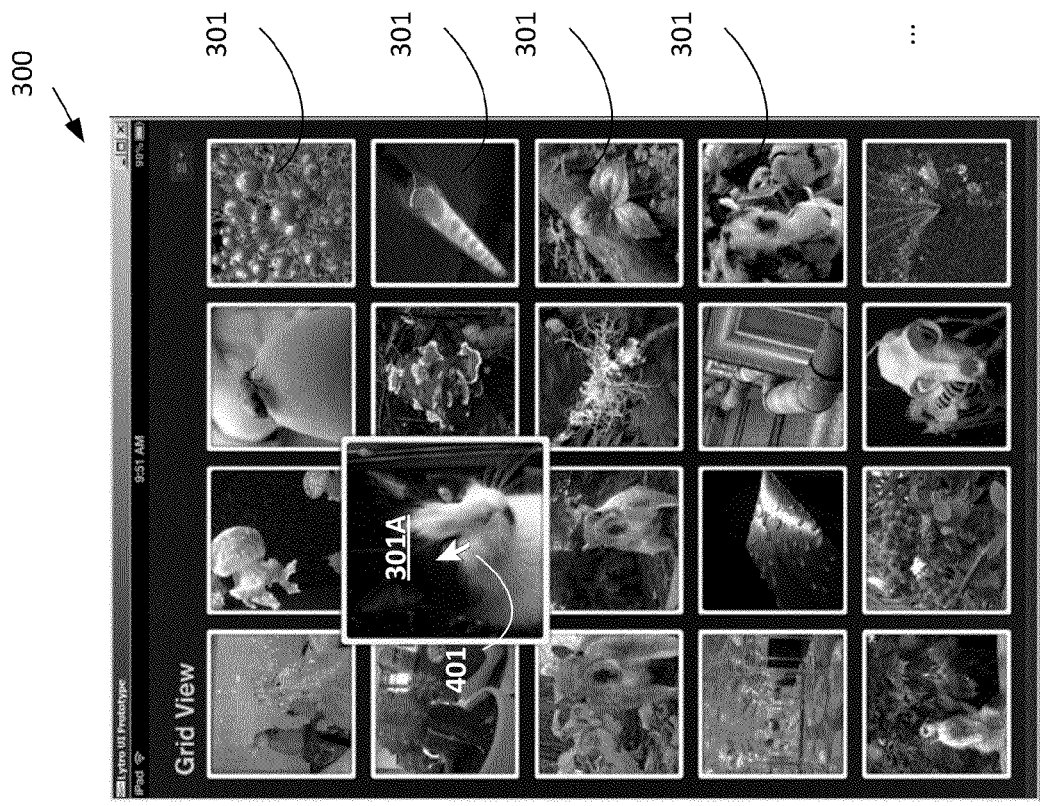

In FIG. 3D, cursor 401 has been restored to its original position as in FIG. 3A; thumbnail 301A is still highlighted, and is displayed at the same viewpoint as in FIG. 3A. In FIG. 3E, cursor 401 has been moved to the right but is still hovering over thumbnail 301A. Again, thumbnail 301A is still highlighted, but it is shown from a different viewpoint, causing a parallax shift to the right in response to the movement of cursor 401. Again, in this example, other, non-highlighted thumbnails 301 are unaffected by the movement of cursor 401 within highlighted thumbnail 301A.

Vertical parallax shifts, or parallax shifts in any direction, can be performed in a similar manner.

Referring now to FIG. 4B, there is shown an example of application of a parallax effect to a single highlighted thumbnail image 301A, in response to changes in cursor 401 position, according to one embodiment. For illustrative purposes, FIG. 4B depicts the parallax shift in an exaggerated manner. FIG. 4B depicts five different versions of a display 300 containing thumbnail images 301; thumbnail 301A is highlighted since cursor 401 is hovering over that thumbnail 301A.

In initial version 300F, cursor 401 is positioned near the center of display 300F, and each thumbnail image 301 is shown from a viewpoint that places its content at an initial position that is relatively central with respect to the edges of the thumbnail image 301. In other versions 300G through 300K, cursor 401 has moved to different positions but is still hovering over highlighted thumbnail 301A. The viewpoint of highlighted thumbnail image 301A is adjusted according to the movement of cursor 401, while viewpoints of other images 301 remain unchanged. For example, in version 300G, cursor 401 has moved upward; accordingly, the viewpoint of highlighted thumbnail image 301A is shifted upward, applying a parallax effect that causes the content of highlighted thumbnail image 301A to move closer to its upper edge. In version 300K, cursor 401 has moved to the right; accordingly, the viewpoint of highlighted thumbnail image 301A is shifted rightward, applying a parallax effect that causes the content of highlighted thumbnail image 301A to move closer to its right edge.

In at least one embodiment, display 300 responds dynamically to user 230 input. Thus, as user 230 causes cursor 401 to move around the screen, viewpoint of a highlighted thumbnail 301A (or viewpoints of multiple thumbnails 301A) is/are changed in a dynamic manner responsive to the input.

In at least one embodiment, parallax effects are applied in response to user movement of cursor 401 in any direction. In at least one other embodiment, parallax effects are applied along only one axis (such as horizontal or vertical), so that they only respond to cursor 401 movement along that axis.

Figure 13:
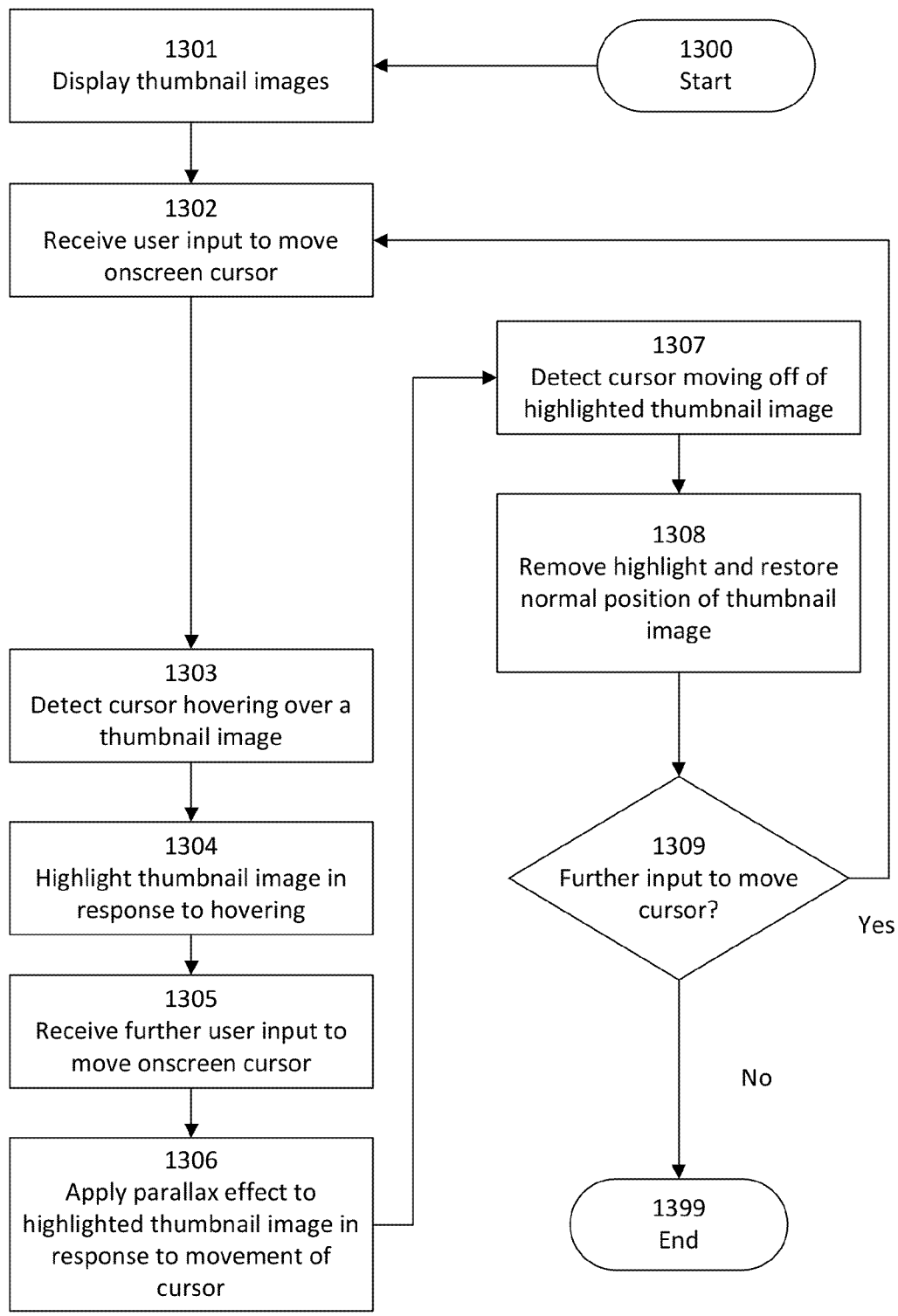
FIG. 13 is a flow diagram depicting an example of application of a parallax effect to a thumbnail image, in response to changes in cursor position, according to one embodiment.

Referring now to FIG. 13, there is shown a flow diagram depicting an example of application of a parallax effect to a thumbnail image 301 in response to changes in cursor 401 position, according to one embodiment. One skilled in the art will recognize that the sequence of steps shown in FIG. 13 represents merely one possible sequence that can take place in connection with the method of the present invention, and that this particular sequence is shown for illustrative purposes only; in operation, the method of the present invention can omit some of the depicted steps, perform other steps, and/or perform the same steps in a different order.

The method begins 1300. Thumbnail images 301 are displayed 1301. User input to move onscreen cursor 401 is received 1302; in particular, user input to cause cursor 401 to hover over one of the displayed thumbnail images 301 is detected 1303. In response to this detected input, the thumbnail image 301 is highlighted 1304, for example by being enlarged as depicted and described above.

Further input to move onscreen cursor 401 is received 1305. In response, a parallax effect is applied 1306 to the highlighted thumbnail image 301.

In the example depicted in FIG. 13, user input causing cursor 401 to move off of the highlighted thumbnail image 301 is detected 1307. In response, the highlight is removed 1308 (for example by restoring thumbnail image 301 to its normal size), and the normal, unshifted position of thumbnail image 301 is restored 1308.

If, in step 1309, further input is detected, the method returns to step 1302. Otherwise, the method ends 1399.

One skilled in the art will recognize that similar changes to viewpoints can be made in response to changes to any environment condition or input. For example, in a device that includes an accelerometer, gyroscope, and/or other mechanism for sensing movement, position, and/or orientation, parallax shifts can be triggered by changes to the device's position or orientation. Thus, if a user tilts the device, a parallax shift can be performed to cause viewpoint(s) for one or more thumbnails 301 to change in response to the detected tilting operation.

In at least one embodiment, parallax shift can take place in response to scrolling operations. For example, viewpoints for thumbnails 301 can be adjusted based on a current scroll position, and/or based on current scroll direction and speed. In an embodiment where the viewpoint is adjusted based on direction and speed, a faster scroll might result in a more pronounced shift in viewpoint, at least for the duration of the scroll operation.

In at least one embodiment, viewpoints for thumbnails 301 are adjusted while a scroll operation is in progress, and the original viewpoints are restored once the scroll operation is complete. In at least one embodiment, a bounce effect can be implemented: upon completion of a scroll operation, viewpoints for those thumbnails 301 that were in motion can be made to momentarily overshoot their original position before they return to the original position. Such an effect can give the impression of inertia and physicality to thumbnail images 301. An example is as follows:

Viewpoints established at initial position for all displayed thumbnails 301.

User 230 initiates downward scroll operation; viewpoints for displayed thumbnails 301 are adjusted downward based on speed of scroll operation.

User 230 stops downward scroll; viewpoints for displayed thumbnails 301 bounce by momentarily being adjusted upward of their original position before coming to rest at their original position.

The bounce effect can be made as elaborate as desired, and may include more than one instance of overshooting before the viewpoint comes to rest at its original position.

In at least one embodiment, all transitions from one viewpoint to another are performed smoothly and without discontinuity, whether or not they include a bounce effect.

Figure 3G:
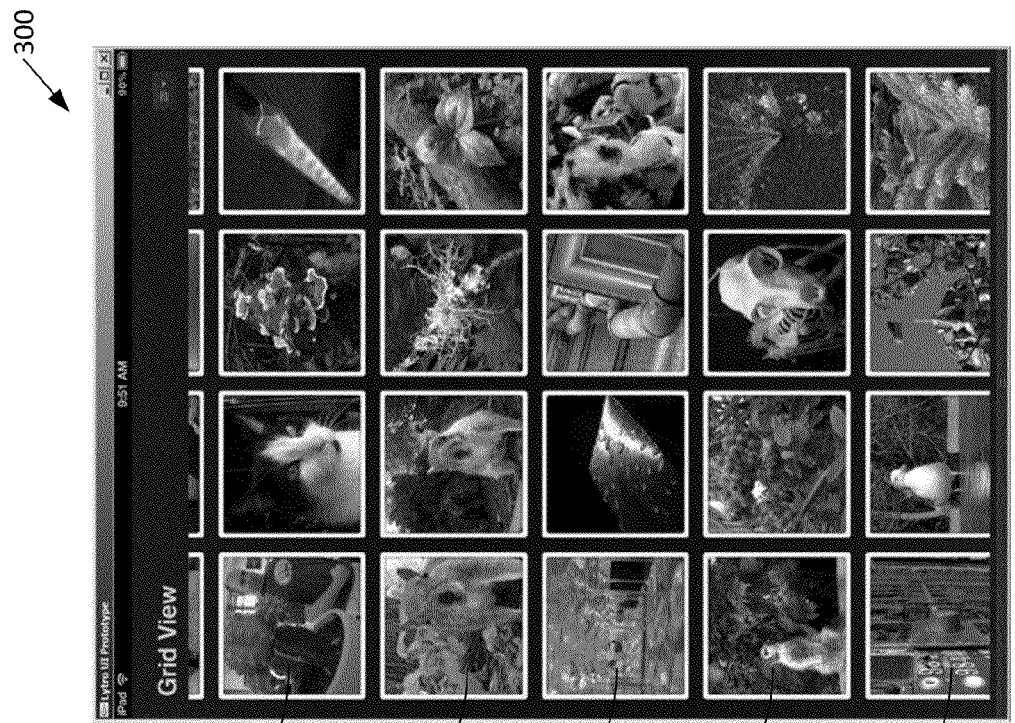
Figure 3F:
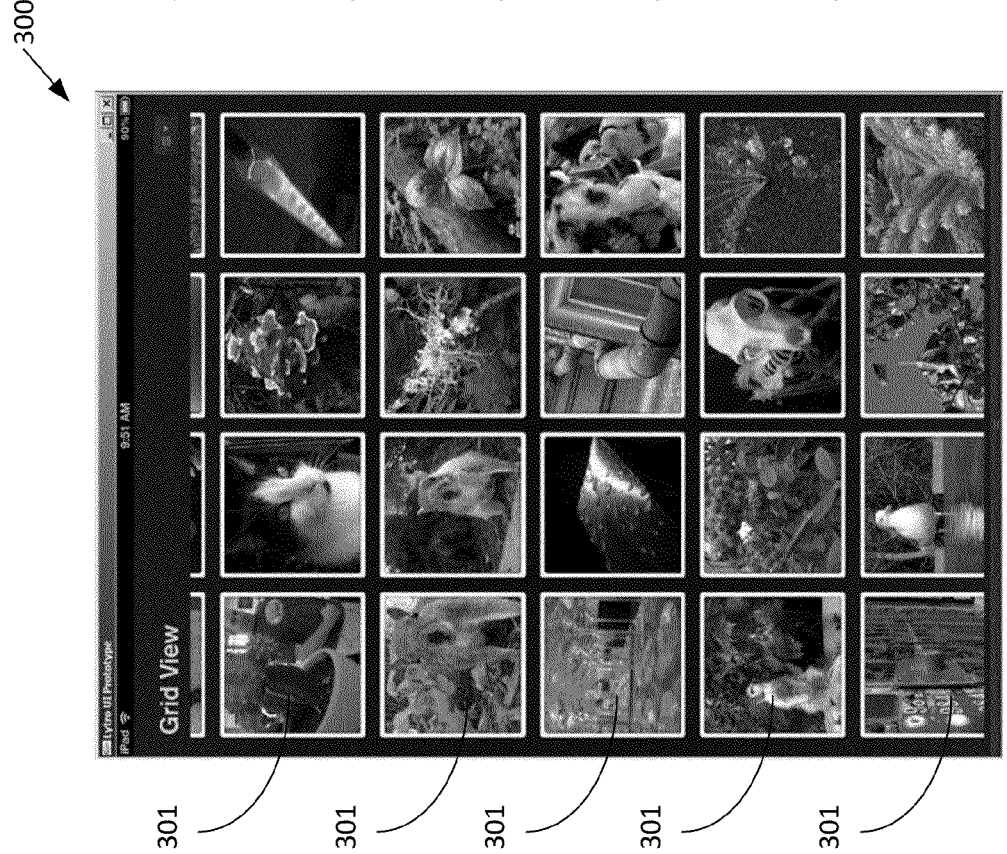

Referring now to FIGS. 3F and 3G, there is shown an example of parallax shift in response to a scroll operation. FIG. 3F is a screen shot depicting an example of a display 300 during an upward scroll operation. Viewpoints for all displayed thumbnails 301 are shifted upward in response to the scroll operation. FIG. 3G is a screen shot depicting display 300 after the upward scroll operation has completed. Viewpoints for all displayed thumbnails 301 are restored to their original position.

Figure 5:
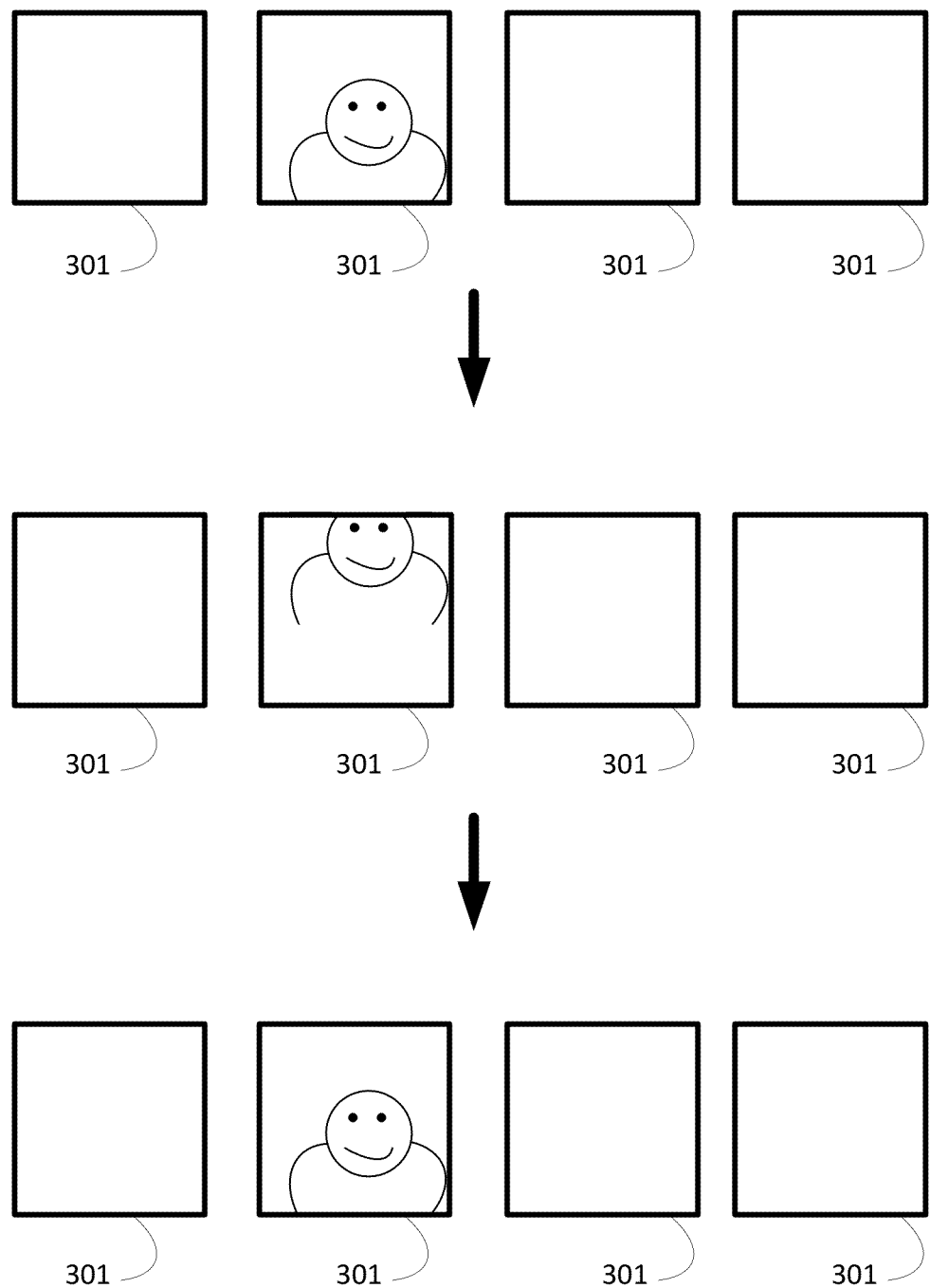
FIG. 5 depicts an example of application of a vertical parallax effect to a subset of thumbnail images, in response to an upward scrolling operation, according to one embodiment.

Referring now to FIG. 5, there is shown an example of application of a vertical parallax effect to a subset of thumbnail images 301, in response to an upward scrolling operation, according to one embodiment. For illustrative purposes, the change in viewpoint is exaggerated in FIG. 5, and only one image 301 is displayed with content.

In the top part of FIG. 5, thumbnails 301 are displayed at an initial viewpoint. In the middle part, the upward scrolling operation is in progress, and viewpoints for thumbnails 301 are shifted upward. In the bottom part, the scrolling operation has completed, so that thumbnails 301 are at rest; viewpoints are restored to their original position. For illustrative purposes, the bounce effect is omitted; however, if it were included, it would be shown as a momentary downward shift in viewpoint beyond the original position prior to the final display at the original position.

Figure 6:
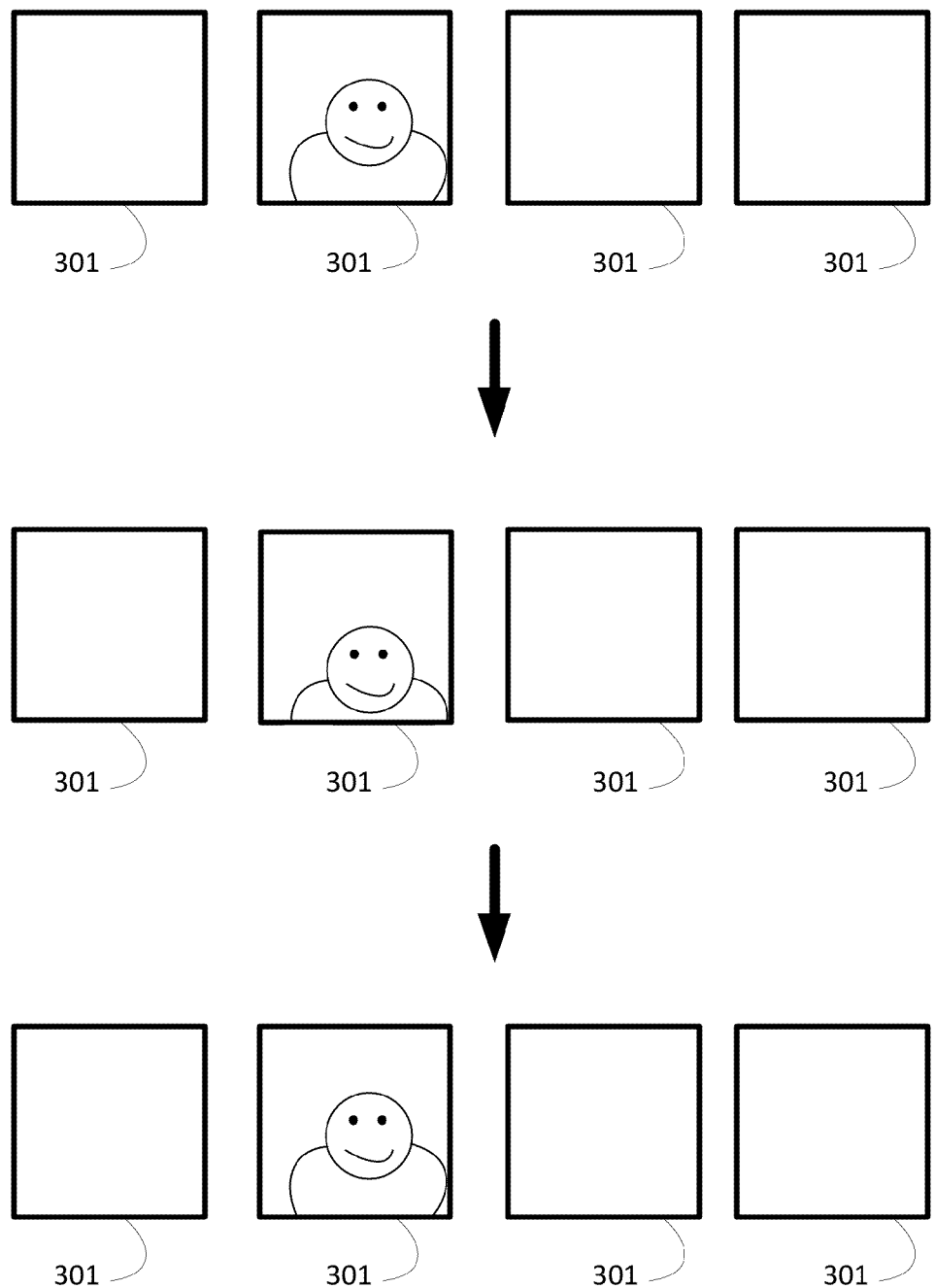
FIG. 6 depicts an example of application of a vertical parallax effect to a subset of thumbnail images, in response to a downward scrolling operation, according to one embodiment.

FIG. 6 depicts a similar example, but with downward scrolling instead of upward scrolling. Similar parallax shifts can be implemented in horizontal directions in response to horizontal scrolling.

Figure 14:
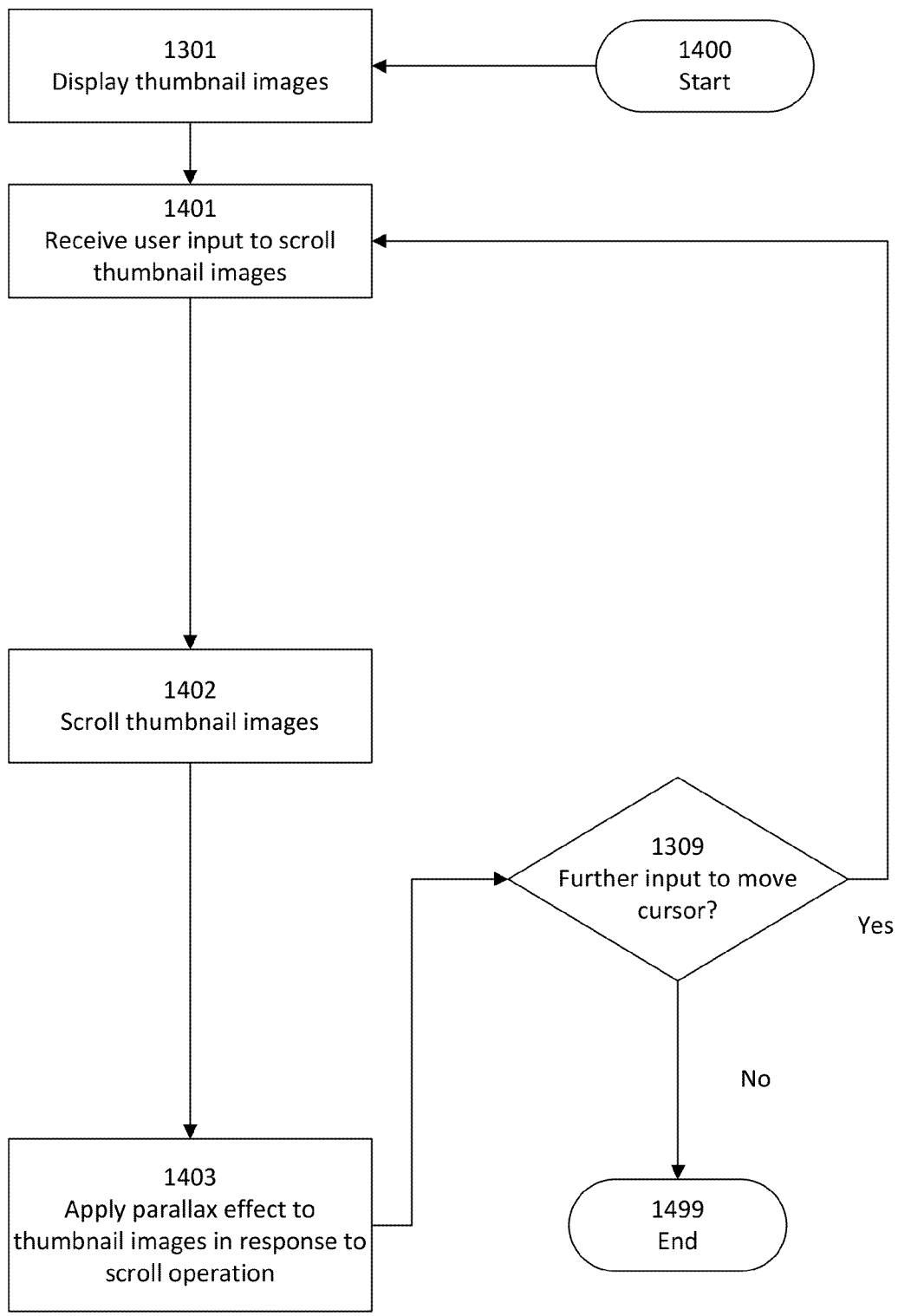
FIG. 14 is a flow diagram depicting an example of application of a parallax effect to thumbnail images, in response to a scrolling operation, according to one embodiment.

Referring now to FIG. 14, there is shown a flow diagram depicting an example of application of a parallax effect to thumbnail images 301, in response to a scrolling operation, according to one embodiment. One skilled in the art will recognize that the sequence of steps shown in FIG. 14 represent merely one possible sequence that can take place in connection with the method of the present invention, and that this particular sequence is shown for illustrative purposes only; in operation, the method of the present invention can omit some of the depicted steps, perform other steps, and/or perform the same steps in a different order.

The method begins 1400. Thumbnail images 301 are displayed 1301. User input to scroll thumbnail images 301 is received 1401. For example, the user may perform a swipe input operation on a touch-sensitive screen, or perform any other input operation that can be interpreted as a scroll command. Alternatively, scrolling can be initiated by some other means, such as automatically.

In response to the scroll input, thumbnail images 301 are scrolled 1402, and a parallax effect is applied 1403 to the thumbnail images 301. As described above, the parallax effect can be performed in response to scroll position or scroll velocity and direction. In at least one embodiment, upon completion of the scroll operation, thumbnail images 301 are returned to their unshifted position.

If, in step 1309, further input is detected, the method returns to step 1401. Otherwise, the method ends 1499.

Shifting Parallax of Framing Elements

In at least one embodiment, the techniques of the present invention can be used to apply a parallax shift effect to framing elements that surround or accompany thumbnail images. The framing elements can be of any type and appearance; for example, in at least one embodiment, the framing elements can be designed so that they appear to be closer than the thumbnail images themselves. The parallax shift effect can be applied in response to the display environment, such as in response to user input to move a cursor, move a contact point with respect to a touch-sensitive screen, tilt or move the device, initiate or stop a scroll operation, and/or the like. The application of the parallax shift effect serves to reinforce an impression of depth and thereby improve the user experience.

In at least one embodiment, framing elements can be specified as three-dimensional objects with their own specified depth characteristics. In embodiments where thumbnail images 301 are represented as light-field images, framing elements can be specified as three-dimensional objects having depth appropriate to the depth of objects and elements within the light-field images. The three-dimensional framing elements can also be applied to two-dimensional images, if desired. The three-dimensional framing elements can themselves have and respond to parallax shifts.

Referring now to FIG. 7A, there is shown a screen shot depicting an example of a display 300 according to one embodiment, as it might be presented on an output device 203 such as a display screen of computing device 201. Display 300 is similar to that depicted and described above in connection with FIG. 3A, including any number of thumbnail images 301, which may be arranged in a grid or any other suitable arrangement. Here, however, each thumbnail image 301 is surrounded by a framing element 701. In this example, each framing element 701 takes the form of a plurality of squares that overlap one another to give the impression of a stack of thumbnails; the squares are rotated with respect to one another so that their edges and corners are visible. Furthermore, those squares that are meant to appear to be at greater depth are faded with respect to those that are closer. In this example, the thumbnail image 301 is depicted as being closer (i.e. on top of) the framing element 701.

One skilled in the art will recognize that the particular layout and appearance of framing elements 701 shown in FIG. 7A is merely exemplary, and that framing elements 701 can take any suitable appearance and form. Framing elements 701 can be depicted at a single depth behind thumbnail images 301, or at a plurality of depths. Framing elements 701 can thus be presented as being flat or three-dimensional, as desired. Whichever approach is taken, the parallax shifting effects of the present invention can be selected and applied so that they reinforce the intended presentation of framing elements 701.

Framing elements 701 can be presented for all displayed thumbnails 301 or for a subset of displayed thumbnails 301. In at least one embodiment, for example, framing elements 701 can be presented, for example, for highlighted thumbnails 301 but not other thumbnails. In another embodiment, framing elements 701 can take on different appearance for different thumbnails 301, for example to emphasize one or more highlighted thumbnails 301 and/or thumbnails 301 having particular significance or importance.

As discussed above in connection with FIG. 3A, thumbnail images 301 may be user-selectable and/or user-manipulable; for example, a user may provide input via input device 202 to cause thumbnail images 301 to move, or to select a particular thumbnail image 301 to expand in size. Thumbnail images 301 may also be selectable to provide access to corresponding full-size images, or to videos, applications, documents, or other resources. For example, in an embodiment where output device 203 is a touch-sensitive screen, user 230 can tap on a thumbnail 301 to gain access to a full-sized version of the corresponding image, or to activate a corresponding video, application, document, or the like. In other embodiments, user 230 can select and/or activate a thumbnail 301 using any suitable input device 202 such as a mouse, keyboard, trackball, and/or the like.

In at least one embodiment, a cursor 401 is provided, which moves based on user input. In at least one embodiment, as cursor 401 is moved, framing elements 701 are shifted in the same direction as cursor 401 movement. In another embodiment, output device 203 may be a touch-sensitive display screen; as user 230 changes the position of a contact point with the screen, framing elements 701 are shifted in the same direction as the movement of the contact point. The shifting of framing elements 701 can take place in response to the position of the cursor or contact point, or in response to the speed of movement of the cursor or contact point, or in response to some combination of the two. In yet another embodiment framing elements 701 can shift in response to any other environment condition or input. For example, in a device that includes an accelerometer, gyroscope, and/or other mechanism for sensing movement, position, and/or orientation, framing elements 701 can shift in response to changes to the device's position or orientation. Thus, if a user tilts the device, a parallax shift can be performed to cause framing elements 701 to shift position in response to the detected tilting operation.

FIG. 7A also shows on-screen cursor 401 at an initial position. Referring now also to FIGS. 7B and 7C, there is shown an example of application of a parallax effect to framing elements 701, according to one embodiment. In this example, no thumbnail 301 is selected or highlighted. In this example, framing elements 701 shift position as cursor 401 moves left and right, but thumbnail images 301 do not change appearance in response to movement of cursor 401. More particularly, as cursor 401 moves to the left (as in FIG. 7B), framing elements 701 shift position to the right; conversely, as cursor 401 moves to the right (as in FIG. 7C), framing elements 701 shift position to the left. One skilled in the art will recognize that, in other embodiments, the parallax effect can be applied to framing elements 701 in the opposite direction to that shown. One skilled in the art will further recognize that, in other embodiments, a parallax effect can also be applied to thumbnail images 301 in the manner described above in connection with FIGS. 3A through 3C or in other ways.

In at least one embodiment, the parallax effect can be applied differently to different parts of a framing element 701. For example, the framing elements 701 shown in FIGS. 7A through 7C include a plurality of overlapping squares at different orientations, each intended to be depicted at a different depth. Accordingly, in at least one embodiment, a more pronounced parallax shift can be applied to the squares that are depicted as having greater depth, and a less pronounced shift can be applied to those that are intended to appear to be closer to the viewer. Such an implementation reinforces the impression of three-dimensionality and depth. In another embodiment, all portions of a framing element 701 can be considered to lie at the same depth, so that the same parallax shift is applied to all such portions at any given point in time.

Referring now to FIG. 8, there is shown an example of application of a parallax effect to framing elements 701 of a single thumbnail image 301, in response to changes in cursor position or some other environmental condition, according to one embodiment. For illustrative purposes, FIG. 8 omits the cursor itself, but merely shows the effect of cursor movement (or some other environmental condition) on framing elements 701. FIG. 8 exaggerates the parallax effect for illustrative purposes. FIG. 8 also shows, in an exaggerated form, the application of a more pronounced parallax shift to those portions of framing elements that are depicted as being behind other portions (i.e., having greater depth), and a less pronounced shift being applied to those that are intended to appear to be on top of other portions (i.e., closer to the viewer).

FIG. 8 depicts five different versions of a thumbnail image 301 with its framing elements 701. In the version depicted in the center of the Figure, framing element 701 is centered with respect to thumbnail image 301. Each of the other versions depicts thumbnail image 301 and its framing element 701 as they might be shown after (or during) movement of a cursor in a particular direction, or some other change in an environmental condition such as a tilting of the device in a particular direction. In response to such input or change, framing element 701 is shifted in the opposite direction, with a more pronounced shift being applied to those portions of framing element 701 that have greater depth. For example, the rightmost portion of FIG. 8 depicts thumbnail image 301 and its framing element 701 when cursor (not shown) has been moved to the right, so that framing element 701 is shifted to the left. The top portion of FIG. 8 depicts thumbnail image 301 and its framing element 701 when cursor (not shown) has been moved upward, so that framing element 701 is shifted downward.

As described above, in at least one embodiment, one thumbnail 301 (or a subset of displayed thumbnails 301) may be highlighted or selected. The highlighted or selected thumbnail 301 may be displayed in a manner that is distinctive from other displayed thumbnails 301, for example by being presented in a larger size. In at least one embodiment, in response to user input such as movement of cursor 401, a parallax effect can be applied to the highlighted or selected thumbnail 301 in addition to or instead of the parallax effect being applied to framing elements 701 for all thumbnails 301. This reinforces the highlighting effect, and gives the impression that the highlighted or selected thumbnail 301 is positioned "above" (closer to the viewer than) other thumbnails 301. In at least one embodiment, parallax and/or three-dimensional effects can be applied only to a highlighted or selected thumbnail 301, and not to other displayed thumbnails 301; in another embodiment, such effects are presented in a manner that is more (or less) pronounced for a highlighted or selected thumbnail 301 than for other thumbnails 301.

Referring now to FIG. 7D, there is shown a screen shot depicting an example of a display 300 similar to that shown in FIG. 7A, wherein each displayed thumbnail 301 has corresponding framing elements 701. However, in this example, one thumbnail 301B has been highlighted, for example in response to the user causing cursor 401 to hover over thumbnail 301B, or by clicking on thumbnail 301B, or by positioning a finger on thumbnail 301B (in an embodiment using a touch-sensitive screen), or by some other means. Thumbnail 301B is enlarged with respect to other thumbnails 301, to indicate its highlighted state. In this example, framing element 701B for thumbnail 301B is also enlarged, but is mostly obscured by the enlarged thumbnail 301B. One skilled in the art will recognize that enlargement of a thumbnail 301 is merely one way to highlight it, and that many other mechanisms are available. For example, a highlighted thumbnail may be shown in color while others are black and white, and/or its appearance can be enhanced, brightened, or otherwise adjusted, and/or its frame can be shown in a different color or in some other visually distinctive way, or the like.

In at least one embodiment, when a thumbnail 301 is highlighted, the parallax shift can be applied to highlighted thumbnail 301B and not to other thumbnails 301. In addition, in at least one embodiment, the parallax shift described above in connection with FIGS. 7A through 7C and 8 can be applied to framing elements 701 for all displayed thumbnails 301.

Referring now to FIG. 7E, there is shown a screen shot depicting an example of a display 300 after cursor 401 has been moved to the bottom left corner of thumbnail 301B. Thus, thumbnail 301B is still highlighted, but it is shown from a different viewpoint, causing a parallax shift downward and to the left in response to the movement of cursor 401. In at least one embodiment, the parallax shift is not so pronounced as to make it appear that the underlying content is being dragged by cursor 401. In at least one embodiment, other, non-highlighted thumbnails 301 are unaffected by the movement of cursor 401 within highlighted thumbnail 301A, although their framing elements 701 are shifted in the same manner described above in connection with FIGS. 7A through 7C and 8. In this example, framing elements 701 shift in the opposite direction to the shifting of thumbnail 301B; one skilled in the art will recognize that in other embodiments, framing elements 701 can shift in the same direction, or not at all.

In at least one embodiment, parallax shift is applied to the same extent for all framing elements 701, without regard to the distance of each framing element 701 from the current cursor 401 position. In at least one another embodiment, the parallax shift can be more (or less) pronounced for those framing elements 701 closest to the current position of cursor 401.

In at least one embodiment, no parallax effect is applied for framing element 701 of the currently highlighted thumbnail image 301.

Figure 9:
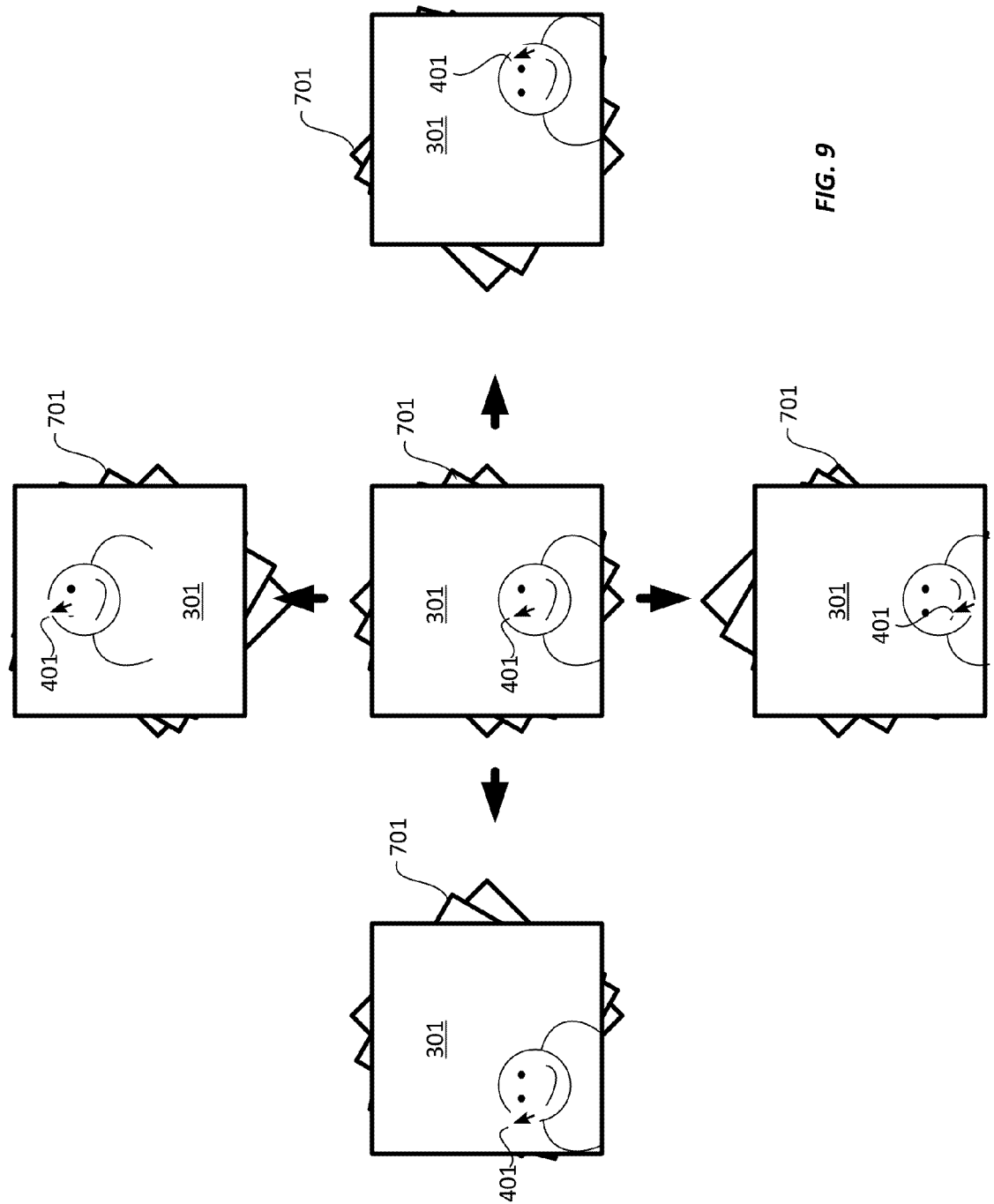
FIG. 9 depicts an example of application of a parallax effect to a single thumbnail image and its framing elements, in response to changes in cursor position, according to one embodiment.

Referring now to FIG. 9, there is shown an example of application of a parallax effect to a single thumbnail image 301 and its framing element 701, in response to changes in cursor 401 position or some other environmental condition, according to one embodiment. In at least one embodiment, this application of a parallax effect is implemented for a highlighted thumbnail image 301 having framing elements 701.

FIG. 9 exaggerates the parallax effect for illustrative purposes. FIG. 9 also shows, in an exaggerated form, the application of a more pronounced parallax shift to those portions of framing element 701 that are depicted as being behind other elements (i.e., having greater depth), and a less pronounced shift being applied to those that are intended to appear to be on top of other elements (i.e., closer to the viewer).

FIG. 9 depicts five different versions of a thumbnail image 301 with its framing element 701. In the version depicted in the center of the Figure, framing element 701 is centered with respect to thumbnail image 301. Each of the other versions depicts thumbnail image 301 and its framing element 701 as they might be shown after (or during) movement of cursor 401 in a particular direction, or some other change in an environmental condition such as a tilting of the device in a particular direction. In response to such input or change, thumbnail image 301 is shifted in a corresponding direction, and framing element 701 is shifted in the opposite direction, with a more pronounced shift being applied to those portions of framing element 701 that have greater depth. For example, the rightmost portion of FIG. 9 depicts thumbnail image 301 and its framing element 701 when cursor (not shown) has been moved to the right, so that thumbnail image 301 is shifted to the right and framing element 701 is shifted to the left. The top portion of FIG. 8 depicts thumbnail image 301 and its framing element 701 when cursor (not shown) has been moved upward, so that thumbnail image 301 is shifted upward and framing element 701 is shifted downward.

Figure 15:
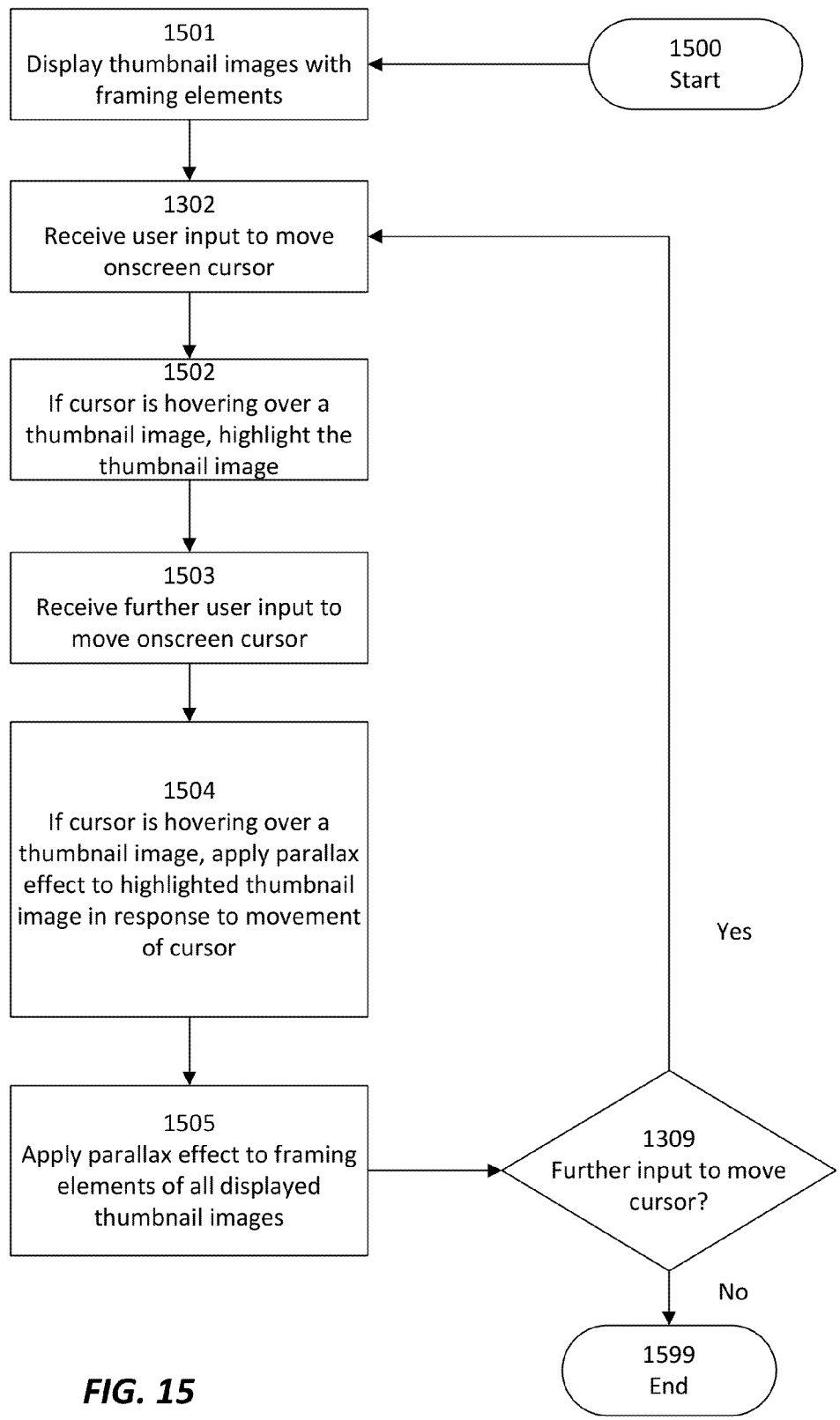
FIG. 15 is a flow diagram depicting an example of application of a parallax effect to thumbnail images and their framing elements, in response to changes in cursor position, according to one embodiment.

Referring now to FIG. 15, there is shown a flow diagram depicting an example of application of a parallax effect to thumbnail images 301 and their framing elements 701, in response to changes in cursor 401 position, according to one embodiment. One skilled in the art will recognize that the sequence of steps shown in FIG. 15 represent merely one possible sequence that can take place in connection with the method of the present invention, and that this particular sequence is shown for illustrative purposes only; in operation, the method of the present invention can omit some of the depicted steps, perform other steps, and/or perform the same steps in a different order.

The method begins 1500. Thumbnail images 301 and their framing elements 701 are displayed 1501. User input to move onscreen cursor 401 is received 1302. If the user input causes cursor 401 to hover over one of the displayed thumbnail images 301, that thumbnail image 301 is highlighted 1502, for example by being enlarged as depicted and described above.

Further input to move onscreen cursor 401 is received 1503. In response, if cursor 401 is still hovering over a thumbnail image 301, a parallax effect is applied 1504 to that highlighted thumbnail image 301. In addition, in response to the input to move onscreen cursor 401, a parallax effect is applied 1505 to framing elements 701 of all displayed thumbnail images 301. As described above, in one embodiment, application of the parallax effect to the framing elements 701 is performed in the opposite direction of cursor movement.

If, in step 1309, further input is detected, the method returns to step 1302. Otherwise, the method ends 1599.

Light-Field Images

As described above, in at least one embodiment, the system and method of the present invention is implemented using thumbnail images 301 that are light-field images. Such light-field images, or other depth-enhanced images, can be presented at different depths and/or viewpoints.

A parallax effect can thereby be applied differently to different thumbnail images 301 depending on the intended depth at which each particular thumbnail image 301 is being displayed. This intended depth, also referred to as lambda, can be adjusted so as to avoid unwanted clipping of the image when a parallax effect is applied. Such adjustment can be made to individual thumbnail images 301, or to groups of thumbnail images 301, or to a picture that includes any number of thumbnail images 301, or to all displayed thumbnail images 301. In addition, the lambda adjustment can be made to the content within the frame of a thumbnail 301, as distinct from applying the adjustment to the thumbnail 301 as a whole.

Figure 10:
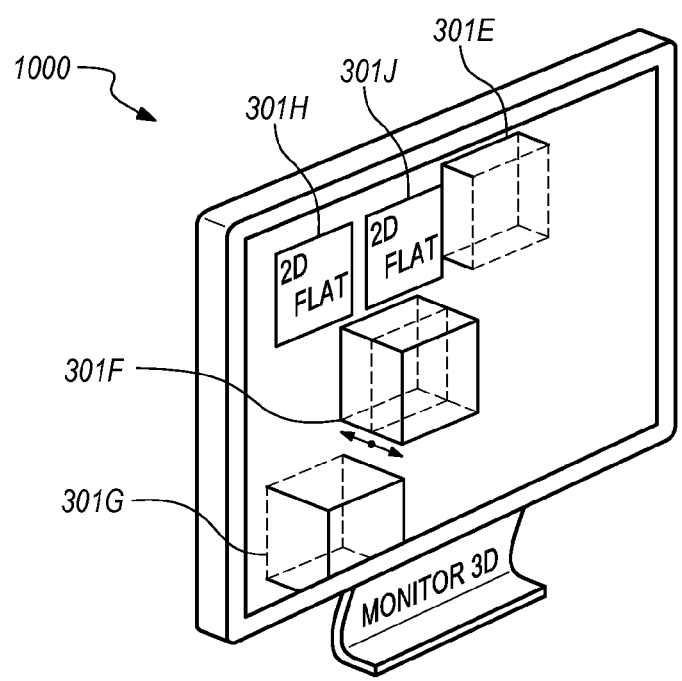
FIG. 10 is a conceptual diagram depicting an example of application of the techniques of the present invention to light-field images used as thumbnail images, according to one embodiment.

Referring now to FIG. 10, there is shown a conceptual illustration of this phenomenon, as it affects the display of light-field images used as thumbnail images 301, according to one embodiment. Here, a zero-parallax lambda represents that value of lambda corresponding to the thumbnail image 301 being displayed at the plane of the monitor. Each thumbnail image 301 being displayed on monitor 1000 is a light-field image that contains elements at different depths. Monitor 1000 has a plane representing a fixed distance from the viewer. Monitor 1000 may be capable of displaying three-dimensional images, or it can be a conventional two-dimensional monitor.

In thumbnail image 301E, all elements of the thumbnail image are behind the plane of monitor 1000. In thumbnail image 301F, some elements of the thumbnail image are behind the plane of monitor 1000, some in front, and some potentially intersect the plane of monitor 1000. In thumbnail image 301G, all elements of the thumbnail image are in front of the plane of monitor 1000. Also shown in FIG. 10 are two thumbnail images 301H, 301J that do not have depth components, but are merely depicted in two dimensions on the monitor plane.

As can be seen by the example of FIG. 10, placement of all elements of a thumbnail image 301 too far forward can lead to unnatural clipping, particularly when the thumbnail image 301 is located close to the edge of monitor 1000. This phenomenon of unnatural clipping is exemplified by thumbnail image 301G in the Figure.

In at least one embodiment, this unnatural clipping is reduced or eliminated by adjusting the lambda value to ensure that thumbnail image 301 is not displayed too far forward with respect to monitor 1000 plane.

In at least one embodiment, the lambda value of a thumbnail image 301 is adjusted in response to the user clicking a cursor at a particular location within thumbnail image 301. For example, the lambda value can be adjusted from its current location to the lambda value represented by an element of the thumbnail image 301 at the click point. The transition in depth can be performed smoothly over some short period of time. As a result, clicking or tapping on a particular location within a thumbnail image 301 animates the thumbnail image 301 forward or backward until the clicked-on object is at the plane of monitor 1000.

Figure 11:
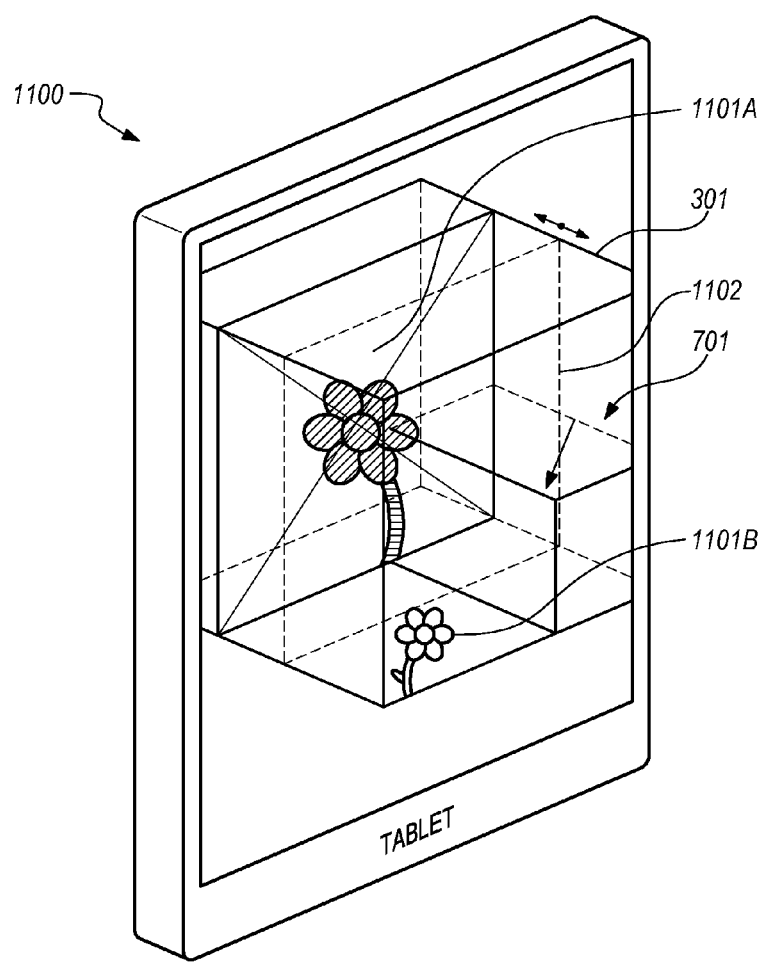
FIG. 11 is a conceptual diagram depicting another example of display of a click-to-refocus operation as applied to a light-field thumbnail image, according to one embodiment.

Referring now to FIG. 11, there is shown an example of a click-to-refocus operation as applied to a light-field thumbnail image 301 according to one embodiment. Here, the operation is depicted as it might appear on a display screen 1100 of a tablet computing device. The plane 1102 of display screen 1100 is shown as a dashed line, for illustrative purposes only. In this example, thumbnail image 301 includes at least two objects: flower 1101A located behind plane 1102, and flower 1101B located in front of plane 1102. Clicking on either object causes the lambda, or depth, of image 301 to be adjusted to place that object at image plane 1102. More particularly, if the user taps or clicks at the location indicated by cursor 701 directly above background flower 1101A, which is currently behind plane 1102, the depth of flower 1101A (and of entire thumbnail image 301) is brought forward in a smoothly animated fashion until flower 1101A is at a depth that matches image plane 1102. Conversely, if the user taps or clicks at the location corresponding to foreground flower 1101B, which is currently in front of plane 1102, the depth of flower 1101E (and of entire thumbnail image 301) is moved backward in a smoothly animated fashion until flower 1101E is at a depth that matches image plane 1102.

Further details on the click-to-focus operation are provided in related U.S. Utility application Ser. No. 11/948,901 for "Interactive Refocusing of Electronic Images," filed Nov. 30, 2007, the disclosure of which is incorporated herein by reference.

In at least one embodiment, adjustments to lambda are combined with some degree of overscan. This is performed in order to avoid missing some visual data near the edges of cursor 701.

Figure 12:
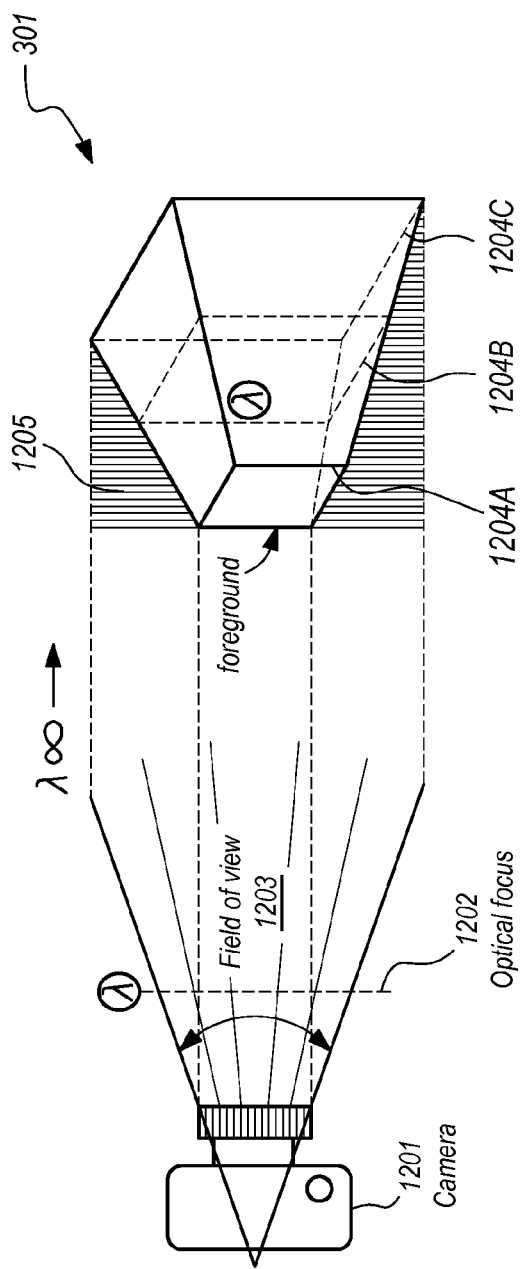
FIG. 12 is a conceptual diagram illustrating the possibility of missing data resulting from a shift in depth for a thumbnail image, according to one embodiment.

Referring now to FIG. 12, there is shown a conceptual diagram illustrating the possibility of missing data resulting from a shift in depth for a thumbnail image 301, according to one embodiment. The shift in depth refers to zero-parallax lambda depth, which corresponds to a lambda positioned at screen depth. When the zero-parallax lambda depth is either too high or too low, regions of missing data are revealed. In at least one embodiment, overscanning is performed when zero-parallax lambda depth is being adjusted, so as to avoid missing data.

In the example of FIG. 12, thumbnail 301 contains foreground elements at depth 1204A, midground elements at depth 1204B, and background elements at depth 1204C. Camera 1201 has a limited field of view 1203 that tapers outward with increasing distance from camera 1201.

As can be seen in the right-hand side of FIG. 12, the limited field of view 1203 translates to different-sized squares representing the limits of the field of view 1203 for different depths of objects within thumbnail 301. Foreground objects at depth 1204A will only appear if they are within a relatively small area represented by the smaller square. Midground objects at depth 1204B will only appear if they are within a the area represented by the intermediate square. Background objects at depth 1204C will only appear if they are within a the area represented by the larger square.

Shaded area 1205 indicates that region that will not be available for display since it lies outside the field of view of camera 1201. Thus, if the user were to click on an object at foreground depth 1204A, causing the lambda to be adjusted so that the foreground object is moved to the plane of the monitor, insufficient visual data would be available to fill the field of view. Specifically, that portion indicated by the shaded area 1205 would not be available. In at least one embodiment, overscan is performed so as to make this additional visual data available in the event of such lambda adjustment. In addition, the overscan amount can depend on screen contents themselves, and more particularly can depend on the lambda values of the screen contents.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for applying a parallax effect to a display of a plurality of thumbnail images, wherein each thumbnail image comprises a representation of a light-field image, the method comprising:
    on a display screen, displaying, for each light-field image, a thumbnail image comprising a first projection of the light-field image at a first viewpoint;
    at an input device, receiving user input; and
    responsive to the user input, applying a parallax shift to change an apparent viewpoint by, for each of at least a subset of the light-field images, replacing the displayed thumbnail image comprising the first projection with a thumbnail image comprising a second projection of the light-field image at a second viewpoint.

2. The method of claim 1, wherein each thumbnail image is displayed within a frame, and wherein applying a parallax shift to change an apparent viewpoint for a thumbnail image comprises shifting the display position of the thumbnail image within its frame.

3. The method of claim 1, wherein each thumbnail image comprises a plurality of representations of objects at different depths, and wherein applying a parallax shift to change an apparent viewpoint for a thumbnail image comprises moving the representations of the objects in relation to one another based on their relative depths.

4. The method of claim 1, wherein applying a parallax shift to change an apparent viewpoint for at least a subset of the displayed thumbnail images comprises simultaneously applying a parallax shift to change the apparent viewpoint for all displayed thumbnail images.

5. The method of claim 1, wherein:
    receiving user input comprises receiving user input to cause an on-screen cursor to move from a first position to a second position; and
    applying a parallax shift to change an apparent viewpoint for at least a subset of the displayed thumbnail images comprises applying a parallax shift to change the apparent viewpoint responsive to the current position of the on-screen cursor.

6. The method of claim 1, wherein:
    receiving user input comprises receiving user input to cause an on-screen cursor to move; and
    applying a parallax shift to change an apparent viewpoint for at least a subset of the displayed thumbnail images comprises applying a parallax shift to change the apparent viewpoint responsive to the direction and speed of movement of the on-screen cursor.

7. The method of claim 1, wherein:
    receiving user input comprises receiving user contact at a position on a touch-sensitive screen; and
    applying a parallax shift to change an apparent viewpoint for at least a subset of the displayed thumbnail images comprises applying a parallax shift to change the apparent viewpoint responsive to a change in position of the user contact.

8. The method of claim 1, wherein the display screen is a component of a mobile device, and wherein:
    receiving user input comprises detecting a change in orientation of the mobile device; and
    applying a parallax shift to change an apparent viewpoint for at least a subset of the displayed thumbnail images comprises applying a parallax shift to change the apparent viewpoint responsive to a change in position of the user contact.

9. The method of claim 1, wherein:
    receiving user input comprises receiving user input to initiate a scroll operation; and
    applying a parallax shift to change an apparent viewpoint for at least a subset of the displayed thumbnail images comprises applying a parallax shift to change the apparent viewpoint responsive to a current scroll position.

10. The method of claim 1, wherein:
    receiving user input comprises receiving user input to initiate a scroll operation; and
    applying a parallax shift to change an apparent viewpoint for at least a subset of the displayed thumbnail images comprises applying a parallax shift to change the apparent viewpoint responsive to a current scroll speed.

11. The method of claim 10, further comprising:
    at the input device, receiving user input to stop the scroll operation; and
    responsive to the user input to stop the scroll operation, restoring the original apparent viewpoint for at least a subset of the displayed thumbnail images.

12. The method of claim 10, wherein applying a parallax shift to change the viewpoint responsive to a current scroll speed comprises applying a parallax shift to change the apparent viewpoint by shifting the apparent viewpoint in a first direction, the method further comprising:
    at the input device, receiving user input to stop the scroll operation; and
    responsive to the user input to stop the scroll operation, for at least a subset of the displayed thumbnail images:
        momentarily shifting the apparent viewpoint in a second direction opposite the first direction; and
        subsequently restoring the original apparent viewpoint.

13. The method of claim 10, wherein applying a parallax shift to change the apparent viewpoint responsive to a current scroll speed comprises applying a parallax shift to change the apparent viewpoint in the direction of the scroll operation.

14. The method of claim 10, wherein applying a parallax shift to change the apparent viewpoint responsive to a current scroll speed comprises applying a parallax shift to change the apparent viewpoint in a direction opposite to the direction of the scroll operation.

15. The method of claim 1, further comprising:
    highlighting at least one thumbnail image responsive to user input;
    wherein:
    applying a parallax shift to change an apparent viewpoint for at least a subset of the displayed thumbnail images comprises applying a parallax shift to change an apparent viewpoint for the highlighted at least one thumbnail image, while leaving unchanged at least one non-highlighted thumbnail image.

16. The method of claim 1, further comprising:
responsive to receiving user input to highlight a thumbnail image, highlighting the thumbnail image; and
responsive to receiving user input to cause an on-screen cursor to move from a first position to a second position within the highlighted thumbnail image, applying a parallax shift to change an apparent viewpoint for the highlighted thumbnail image, while leaving unchanged at least one non-highlighted thumbnail image;
and wherein applying a parallax shift to change an apparent viewpoint for at least a subset of the displayed thumbnail images comprises, responsive to receiving user input to receiving user input to initiate a scroll operation, applying a parallax shift to change an apparent viewpoint for at least a subset of the displayed thumbnail images responsive to a current scroll position.

17. The method of claim 16, wherein highlighting the thumbnail image comprises displaying the thumbnail image at a larger size as compared with non-highlighted images.

18. The method of claim 1, further comprising:
receiving user input to select a location within a displayed thumbnail image; and
responsive to the received user input to select a location within a displayed thumbnail image, adjusting a depth value for the displayed thumbnail image so that an object at the selected location is displayed at a depth substantially approximating a depth plane of the display screen.

19. The method of claim 1, further comprising:
receiving user input to select a location within a displayed thumbnail image; and
responsive to the received user input to select a location within a displayed thumbnail image, adjusting a depth for the displayed thumbnail image to substantially approximate a depth of an image located at the selected location.

20. The method of claim 1, wherein applying a parallax shift to change an apparent viewpoint comprises smoothly applying a parallax shift to change an apparent viewpoint.

21. A method for applying a parallax effect to a display of a plurality of thumbnail images, comprising:
displaying a plurality of thumbnail images on a display screen, wherein at least a subset of the thumbnail images have framing elements;
at an input device, receiving user input;
responsive to the user input, applying a parallax shift to change an apparent viewpoint for at least a subset of the displayed framing elements.

22. The method of claim 21, wherein the framing element for a thumbnail image comprises portions that are at different depths, and wherein applying a parallax shift to change an apparent viewpoint for a framing element comprises moving the representations of the portions in relation to one another based on their relative depths.

23. The method of claim 21, wherein applying a parallax shift to change an apparent viewpoint comprises smoothly applying a parallax shift to change an apparent viewpoint.

24. A method for applying a parallax effect to a display of a plurality of thumbnail images, wherein each thumbnail image comprises a representation of a light-field image, the method comprising:
on a display screen, displaying, for each light-field image, a thumbnail image comprising a first projection of the light-field image at a first viewpoint, wherein at least a subset of the thumbnail images have framing elements;
responsive to receiving user input to cause an on-screen cursor to move from a first position to a second position not within any thumbnail image, applying a parallax shift to change an apparent viewpoint for at least a subset of the displayed framing elements;
responsive to receiving user input to highlight a thumbnail image, highlighting the thumbnail image; and
responsive to receiving user input to cause an on-screen cursor to move from a first position to a second position within a highlighted thumbnail image comprising a first projection of a light-field image, applying a parallax shift to change an apparent viewpoint for the highlighted thumbnail image by replacing the displayed thumbnail image comprising the first projection with a thumbnail image comprising a second projection of the light-field image at a second viewpoint.

25. The method of claim 24, wherein applying a parallax shift to change an apparent viewpoint for at least a subset of the displayed framing elements comprises applying a parallax shift to change an apparent viewpoint for all displayed framing elements.

26. The method of claim 24, wherein applying a parallax shift to change an apparent viewpoint for the highlighted thumbnail image comprises applying a parallax shift to change an apparent viewpoint for the highlighted thumbnail image while leaving unchanged at least one non-highlighted thumbnail image.

27. The method of claim 24, wherein highlighting the thumbnail image comprises displaying the thumbnail image at a larger size as compared with non-highlighted images.

28. The method of claim 24, wherein applying a parallax shift to change an apparent viewpoint comprises smoothly applying a parallax shift to change an apparent viewpoint.

29. A computer program product for applying a parallax effect to a display of a plurality of thumbnail images, wherein each thumbnail image comprises a representation of a light-field image, the computer program product comprising:
a non-transitory computer-readable storage medium; and
computer program code, encoded on the medium, configured to cause at least one processor to perform the steps of:
causing the display screen to display, for each light-field image, a thumbnail image comprising a first projection of the light-field image at a first viewpoint; and
responsive to user input received at an input device, causing the display screen to apply a parallax shift to change an apparent viewpoint by, for each of at least a subset of the light-field images, replacing the displayed thumbnail image comprising the first projection with a thumbnail image comprising a second projection of the light-field image at a second viewpoint.

30. The computer program product of claim 29, wherein each thumbnail image is displayed within a frame, and wherein the computer program code configured to cause the display screen to apply a parallax shift to change an apparent viewpoint for a thumbnail image comprises computer program code configured to cause the display screen to shift the display position of the thumbnail image within its frame.

31. The computer program product of claim 29, wherein the computer program code configured to cause the display screen to apply a parallax shift to change an apparent viewpoint for at least a subset of the displayed thumbnail images comprises computer program code configured to cause the display screen to apply a parallax shift to change the apparent viewpoint responsive to at least one of a current scroll position and a current scroll speed.

32. The computer program product of claim 29, further comprising:
  computer program code configured to cause the display screen to highlight at least one thumbnail image responsive to user input;
  wherein:
    the computer program code configured to cause the display screen to apply a parallax shift to change an apparent viewpoint for at least a subset of the displayed thumbnail images comprises computer program code configured to cause the display screen to apply a parallax shift to change an apparent viewpoint for the highlighted at least one thumbnail image, while leaving unchanged at least one non-highlighted thumbnail image.

33. The computer program product of claim 29, further comprising computer program code configured to cause the display screen to, responsive to received user input to select a location within a displayed thumbnail image, adjust a depth value for the displayed thumbnail image so that an object at the selected location is displayed at a depth substantially approximating a depth plane of the display screen.

34. A computer program product for applying a parallax effect to a display of a plurality of thumbnail images, comprising:
  a non-transitory computer-readable storage medium; and
  computer program code, encoded on the medium, configured to cause at least one processor to perform the steps of:
    causing a display screen to display a plurality of thumbnail images, wherein at least a subset of the thumbnail images have framing elements;
    responsive to the user input received at an input device, causing the display screen to apply a parallax shift to change an apparent viewpoint for at least a subset of the displayed framing elements.

35. A computer program product for applying a parallax effect to a display of a plurality of thumbnail images, wherein each thumbnail image comprises a representation of a light-field image, the computer program product comprising:
  a non-transitory computer-readable storage medium; and
  computer program code, encoded on the medium, configured to cause at least one processor to perform the steps of:
    causing a display screen to display, for each light-field image, a thumbnail image comprising a first projection of the light-field image at a first viewpoint, wherein at least a subset of the thumbnail images have framing elements;
    responsive to receiving user input to cause an on-screen cursor to move from a first position to a second position not within any thumbnail image, causing the display screen to apply a parallax shift to change an apparent viewpoint for at least a subset of the displayed framing elements;
    responsive to receiving user input to highlight a thumbnail image, causing the display screen to highlight the thumbnail image; and
    responsive to receiving user input to cause an on-screen cursor to move from a first position to a second position within a highlighted thumbnail image comprising a first projection of a light-field image, applying a parallax shift to cause the display screen to apply a parallax shift to change an apparent viewpoint for the highlighted thumbnail image by replacing the displayed thumbnail image comprising the first projection with a thumbnail image comprising a second projection of the light-field image at a second viewpoint.

36. A system for applying a parallax effect to a display of a plurality of thumbnail images, wherein each thumbnail image comprises a representation of a light-field image, the system comprising:
  a display screen configured to display, for each light-field image, a thumbnail image comprising a first projection of the light-field image at a first viewpoint;
  an input device configured to receive user input; and
  a processor, communicatively coupled to the display screen and to the input device, configured to, responsive to user input received at the input device, cause the display screen to apply a parallax shift to change an apparent viewpoint by causing the display screen to, for each of at least a subset of the light-field images, replace the displayed thumbnail image comprising the first projection with a thumbnail image comprising a second projection of the light-field image at a second viewpoint.

37. The system of claim 36, wherein each thumbnail image is displayed within a frame, and wherein the processor is configured to cause the display screen to apply a parallax shift to change an apparent viewpoint by causing the display screen to shift the display position of the thumbnail image within its frame.

38. The system of claim 36, wherein the processor is configured to cause the display screen to apply a parallax shift to change an apparent viewpoint by causing the display screen to apply a parallax shift to change the apparent viewpoint responsive to at least one of a current scroll position and a current scroll speed.

39. The system of claim 36, wherein:
  the processor is further configured to cause the display screen to highlight at least one thumbnail image responsive to user input; and
  the processor is configured to cause the display screen to apply a parallax shift to change an apparent viewpoint for at least a subset of the displayed thumbnail images by causing the display screen to apply a parallax shift to change an apparent viewpoint for the highlighted at least one thumbnail image, while leaving unchanged at least one non-highlighted thumbnail image.

40. The system of claim 36, wherein the processor is further configured to cause the display screen to, responsive to received user input to select a location within a displayed thumbnail image, adjust a depth value for the displayed thumbnail image so that an object at the selected location is displayed at a depth substantially approximating a depth plane of the display screen.

41. A system for applying a parallax effect to a display of a plurality of thumbnail images, comprising:
  a display screen configured to display a plurality of thumbnail images, wherein at least a subset of the thumbnail images have framing elements;
  an input device configured to receive user input; and
  a processor, communicatively coupled to the display screen and to the input device, configured to, responsive to the user input received at an input device, cause the display screen to apply a parallax shift to change an apparent viewpoint for at least a subset of the displayed framing elements.

42. A system for applying a parallax effect to a display of a plurality of thumbnail images, wherein each thumbnail image comprises a representation of a light-field image, the system comprising:

a display screen configured to display, for each light-field image, a thumbnail image comprising a first projection of the light-field image at a first viewpoint, wherein at least a subset of the thumbnail images have framing elements;

an input device configured to receive user input; and a processor, communicatively coupled to the display screen and to the input device, configured to perform the steps of:

responsive to receiving user input to cause an on-screen cursor to move from a first position to a second position not within any thumbnail image, causing the display screen to apply a parallax shift to change an apparent viewpoint for at least a subset of the displayed framing elements;

responsive to receiving user input to highlight a thumbnail image, causing the display screen to highlight the thumbnail image; and responsive to receiving user input to cause an on-screen cursor to move from a first position to a second position within a highlighted thumbnail image comprising a first projection of a light-field image, causing the display screen to apply a parallax shift to change an apparent viewpoint for the highlighted thumbnail image by replacing the displayed thumbnail image comprising the first projection with a thumbnail image comprising a second projection of the light-field image at a second viewpoint.

* * * * *